(12) United States Patent
Brady et al.

(10) Patent No.: US 11,484,922 B2
(45) Date of Patent: Nov. 1, 2022

(54) APPARATUS AND METHODS FOR REMOVAL, MEASUREMENT, AND MAPPING OF PER- AND POLYFLUOROALKYL SUBSTANCES

(71) Applicant: EZRATERRA, LLC, Bend, OR (US)

(72) Inventors: Patrick Richard Brady, Sisters, OR (US); Dennis Van Grol, Escondido, CA (US)

(73) Assignee: EZRATERRA, LLC, Bend, OR (US)

( * ) Notice: Subject to any disclaimer, the term of this patent is extended or adjusted under 35 U.S.C. 154(b) by 48 days.

(21) Appl. No.: 17/212,874

(22) Filed: Mar. 25, 2021

(65) Prior Publication Data

US 2022/0305537 A1   Sep. 29, 2022

(51) Int. Cl.
*B09C 1/06* (2006.01)
*B09C 1/00* (2006.01)

(52) U.S. Cl.
CPC ............ *B09C 1/06* (2013.01); *B09C 1/005* (2013.01)

(58) Field of Classification Search
CPC ............. B09C 1/06; B09C 1/005; B09B 3/40
See application file for complete search history.

(56) References Cited

U.S. PATENT DOCUMENTS

| 6,296,815 | B1* | 10/2001 | Walker | F23G 7/14 422/184.1 |
|---|---|---|---|---|
| 9,636,723 | B2* | 5/2017 | Brady | B09C 1/06 |
| 10,875,062 | B2 | 12/2020 | Brady | |
| 2003/0147697 | A1* | 8/2003 | Brady | B09C 1/06 405/128.35 |
| 2004/0240942 | A1* | 12/2004 | Richter | B09C 1/005 405/128.35 |
| 2016/0303625 | A1* | 10/2016 | Desmarais | B09C 1/06 |
| 2017/0297926 | A1 | 10/2017 | Nickelsen | |
| 2019/0241452 | A1 | 8/2019 | Ball | |
| 2019/0314876 | A1 | 10/2019 | Oberle | |
| 2019/0381544 | A1* | 12/2019 | Ringuette | B09C 1/06 |
| 2020/0206793 | A1 | 7/2020 | Brady | |

FOREIGN PATENT DOCUMENTS

WO   20190111238 A1   6/2019

* cited by examiner

*Primary Examiner* — Carib A Oquendo
(74) *Attorney, Agent, or Firm* — Raven Patents, LLC; Anton E. Skaugset

(57) ABSTRACT

Apparatus and methods for removing, measuring, and/or mapping per- and polyfluoroalkyl substances (PFAS) present in porous media such as soils, sludges, and colloids by employing both direct and indirect heating methods to transfer thermal energy to the media undergoing treatment. The contaminated media is placed within a media treatment enclosure that incorporates a thermal jacket, and radiatively heated by circulating a heated gas through the thermal jacket. The contaminated media is directly heated by injecting heated treatment gas into the media treatment enclosure. The heated treatment gas is drawn over and/or through the contaminated media to mobilize contaminants from the media and into the treatment gas, which is then collected and processed to recover the contaminant.

20 Claims, 18 Drawing Sheets

APPARATUS AND METHODS FOR REMOVAL, MEASUREMENT, AND MAPPING OF PER- AND POLYFLUOROALKYL SUBSTANCES

TECHNICAL FIELD

This disclosure relates to apparatus for, and methods of, environmental remediation. In particular, the disclosure relates to apparatus and methods for removing, measuring, and/or mapping per- and polyfluoroalkyl substances from porous and colloidal media, such as soils and sludges, among others.

BACKGROUND

Per- and polyfluoroalkyl substances (PFAS, or perfluorinated alkylated substances) include thousands of different synthetic organofluorine compounds that feature multiple fluorine atoms attached to an alkyl chain. PFASs typically include at least one perfluoroalkyl moiety, an alkyl chain in which every hydrogen atom has been replaced by fluorine.

PFAS, and in particular polyfluorinated surfactants, can exhibit highly useful physical properties and so are commonly used in a wide variety of industries including electronics, manufacturing, plastic and rubber production, food production, textile production, firefighting, medicine, and building and construction. PFAS are also found in many consumer products. In addition to consumer and occupational exposures, because our national waste management infrastructure was not designed to contain or remove PFAS, they have largely passed into the environment unabated.

For example, Aqueous Film Forming Foam (AFFF) has been used for decades to extinguish liquid hydrocarbon fires. Selected PFAS are critical components of AFFF, and live firefighting practice exercises as well as actual firefighting activity has resulted in significant PFAS groundwater contamination. Unfortunately, since AFFF formulations include drag reductants, surfactants, and chaotropic agents that all cause groundwater flow to accelerate, PFAS groundwater plumes move faster and go further (several miles) than more conventional environmental contaminants, resulting in extremely large, dilute, commingled plumes.

Once present in the environment, PFAS microemulsions produce stable source structures within the capillary fringe that reliably deliver PFAS and other compounds to groundwater. According to Jurin's law, lower surface tension will reduce the height of the capillary fringe. These PFAS groundwater source structures exist as invisible films located in depressions within the capillary fringe. Dissolved PFAS and other compounds cross the residual capillary fringe into the water table where PFAS plumes may extend for miles. Unfortunately, PFAS groundwater source structures are invisible to traditional investigative methods.

As a result, PFAS are now present in the US food supply, and most Americans now have detectable levels of PFAS in their blood. Recent reports have documented that the water supplies of 200 million Americans are now contaminated with PFAS.

Unfortunately, detection and mapping of environmental PFAS is fraught with challenges. Traditional investigative and detection methods commonly miss the PFAS films that may exist at the top of a depressed capillary fringe. Even when areas are believed to be free of PFAS soil contamination, significant soil contamination may still be found upon excavation due to the entrainment of undetected PFAS films.

What is needed is a method that employs macro sampling and analysis in real time to map PFAS groundwater source structures, and then remove them. A program of PFAS groundwater source structure identification and removal would protect susceptible water supply wells and provide a means to resolve identify and disentangle commingled groundwater plumes.

SUMMARY

The present disclosure is directed to apparatus and methods for removing, measuring, and/or mapping per- and polyfluoroalkyl substances (PFAS) present in porous media such as soils, sludges, and colloids. The contaminated media is placed within a media treatment enclosure that incorporates a thermal jacket, and radiatively heated by circulating a heated gas through the thermal jacket. The contaminated media is directly heated by injecting heated treatment gas into the media treatment enclosure. The heated treatment gas is drawn over and/or through the contaminated media to mobilize contaminants from the media and into the treatment gas, which is then collected and processed to recover the contaminant.

In some examples, the disclosure includes a radiative polarity conversion apparatus for treating porous and colloidal media to remove contaminants, where the apparatus includes a media treatment assembly, including a media treatment enclosure that is configured to rest upon and removably couple to a media treatment base; and a base assembly; including a base and a heater head assembly; where the media treatment assembly is configured to rest upon and removably couple to the base; and the heater head assembly is configured to rest upon and form a seal with the media treatment assembly. The media treatment enclosure includes sidewalls that define a thermal jacket configured to be heated by the circulation of a heated gas within the thermal jacket; and a porous channel assembly including a plurality of porous structures each defining a channel for heated treatment gas, wherein adjacent pairs of porous structures define vertical spaces for receiving media to be treated; such that when the media treatment enclosure including the porous channel assembly rests upon and is coupled to the media treatment base, the vertical spaces defined by the porous channel assembly are substantially filled with media to be treated. Once the filled media treatment assembly rests upon and is coupled to the base, and the heater head assembly rests upon and forms a seal with the filled media treatment assembly, the radiative polarity conversion apparatus is able to circulate heated polar gas through the thermal jacket of the media treatment enclosure via the base; inject heated treatment gas using the heater head assembly into the channels within the porous structures of the porous channel assembly, such that the heated treatment gas contacts the media within the vertical spaces defined by the porous channel assembly; and withdraw the injected treatment gas from the media treatment assembly via the base.

In some examples, the disclosure includes a method of treating contaminated media, the method including placing the contaminated media within a media treatment enclosure that incorporates a thermal jacket; radiatively heating the contaminated media within the media treatment enclosure by circulating a heated gas through the thermal jacket; directly heating the contaminated media within the media treatment enclosure by injecting a heated treatment gas into the media treatment enclosure; drawing the heated treatment gas over and/or through the contaminated media so as to mobilize a contaminant from the contaminated media and into the treatment gas; collecting the contaminated treatment gas; and processing the contaminated treatment gas to recover the contaminant.

The disclosed features, functions, and advantages of the disclosed inspection apparatus, systems, and methods may be achieved independently in various embodiments of the present disclosure, or may be combined in yet other embodiments, further details of which can be seen with reference to the following description and drawings.

DETAILED DESCRIPTION OF PREFERRED EMBODIMENTS

Figure 1:
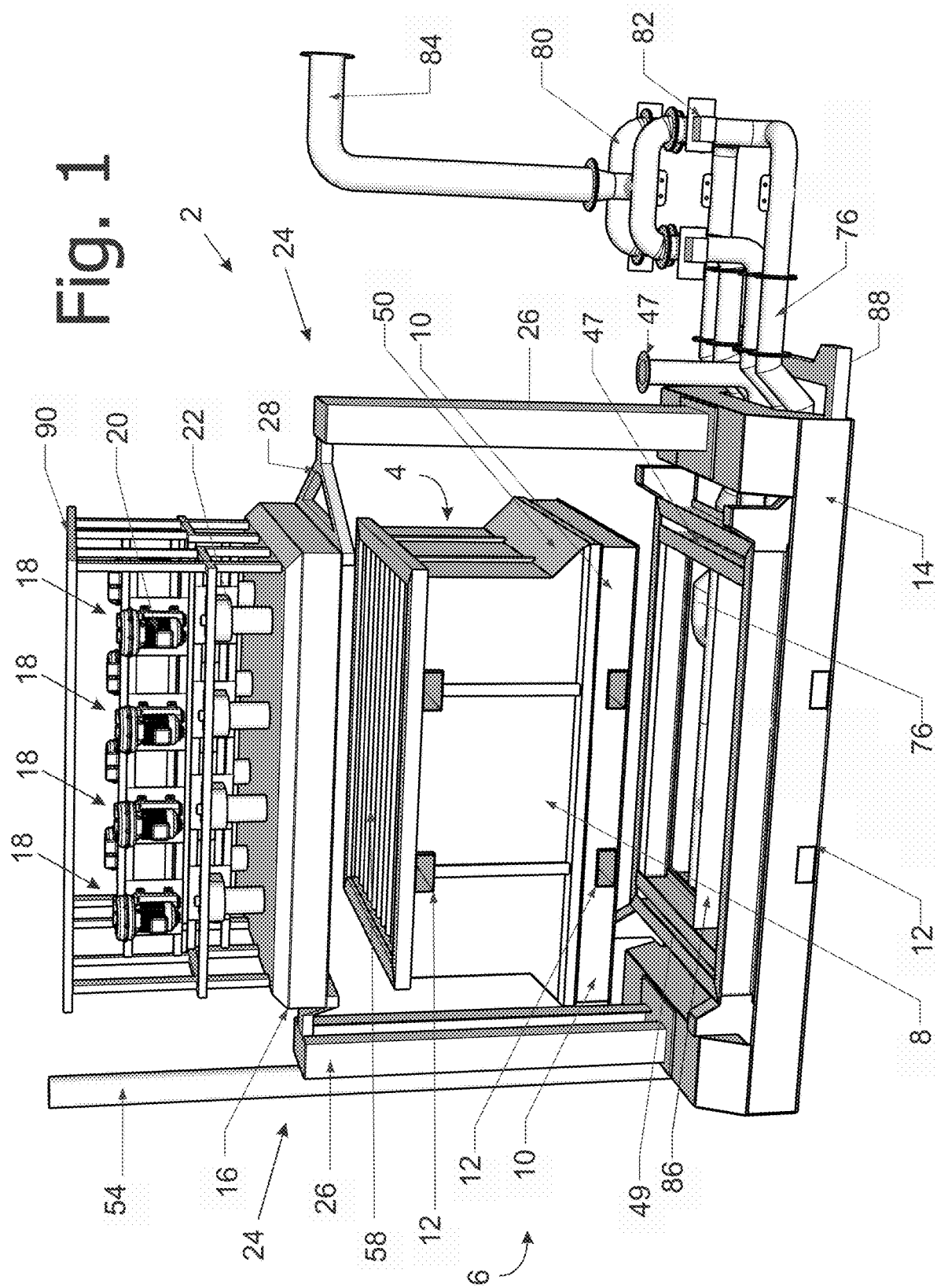
FIG. 1 is a perspective and partially exploded view of an illustrative Radiative Polarity Conversion (RPC) apparatus according to the present disclosure.

The presently disclosed methods and apparatus are able to remove selected contaminants from porous and colloidal media, such as contaminated soils, by employing a Radiative Polarity Conversion (RPC) apparatus, which includes a modified adaptation of the sealable sintering vessel previously described in U.S. Pat. No. 10,875,062 to Brady (2020), hereby incorporated by reference for all purposes. In particular, the disclosed methods and apparatus have particular utility for the removal of per- and polyfluoroalkyl substances (PFAS) from contaminated soils.

PFAS largely occur as complex polymeric fluids in waste infrastructure and release sites. The PFAS molecule is durable; desorption of PFAS molecules, associated mixtures and microemulsions from surfaces are achieved by manipulating "Work of Adhesion".

That is, although the intramolecular forces between atoms in a PFAS molecule are extremely strong (for example, a carbon-fluorine covalent bond), the intermolecular forces between PFAS molecules are significantly weaker in comparison. Intermolecular Van der Waals Forces, and in particular the component London Dispersion Forces, are the primary intermolecular attractive force between PFAS molecules and other particles. These attractive forces are not bonds, but are weaker forces caused by a correlation of the fluctuating polarization of nearby particles and interfaces (e.g. instantaneous dipole-induced dipole forces). These attractive forces between PFAS and other particles are largely due to Coulombic interactions with surface polarity.

Heat can therefore be used to efficiently disorganize surface polarities for a PFAS release, similar to reaching a Curie Point. Even heating of the media under treatment can be an important element in safe PFAS removal, as PFAS can readily migrate within a porous media due to pyroelectric and piezoelectric currents generated by uneven heating.

The application temperature can be a similarly important element in safe PFAS removal treatments. However, by using a flameless thermal temperature-controlled process the production of harmful by-products like HF, oxides of nitrogen ($NO_x$), oxides of sulfur (SOX) and particulate matter (PM) can be avoided. As safe and effective PFAS removal mandates a limit to heating, a high heat transfer efficiency is highly advantageous in order to achieve effective economies of treatment.

Illustrative embodiments and examples of the apparatus and methods described herein permit the safe and efficient removal of PFAS substances from contaminated media, even when such decontamination processes are carried out in the field.

The RPC apparatus employs both direct and indirect heating methods to transfer thermal energy to the media undergoing treatment within the apparatus. In particular, heated polar gases are used to heat an enclosing thermal jacket and provide conductive and radiative heat to the media being treated, while treatment gas also flows directly through gaps formed in the media within the RPC apparatus to maintain parallel treatment gas flow within the media bed.

In particular, because the RPC apparatus employs both indirect and direct heating in combination to heat the porous media under treatment, the volume of treatment gas required can be minimized. In addition, the formation of toxic byproducts during removal can be minimized because operating temperatures can be maintained below the formation temperatures for such byproducts. For example, the removal of PFAS contaminants can be efficiently achieved using conductive, convective, and radiant heat transfer while maintaining temperatures below 1,100° F.

Batch treatment using the RPC apparatus permits macro-measurement of multi-ton samples for characteristics such as media wet density, media dry density, and contaminant intensity and character in order to create geologic and groundwater source structure maps. PFAS can be released into the environment as complex chemical systems that contain many other compounds. These PFAS formulations manipulate surface energies to create thermodynamically stable mixtures designed for a variety of tasks. These formulations are invisible to traditional investigative methods. PFAS releases are currently investigated as a classic solute transport problem. The functionality of these PFAS formulations is not currently evaluated as part of a traditional subsurface investigation. The majority of PFAS occur as reconstituted PFAS-stabilized microemulsion films situated at the top of the depressed capillary fringe. The nature of the films cause migration of PFAS and other compounds to move downward to the water table.

The RPC apparatus can be coupled with any suitable vapor emissions treatment system to recover the contaminants removed by the RPC apparatus, including vapor emissions treatment systems that are commercially available. Particularly advantageous results can be obtained by coupling the RPC apparatus with the vapor emissions treatment systems described by U.S. application Ser. No. 16/788,650 to Brady (filed Feb. 12, 2020), hereby incorporated by reference for all purposes. In particular, by employing the RPC apparatus in place of the polarity conversion unit of application Ser. No. 16/788,650 provides many substantial advantages, including an increased overall thermal transfer efficiency, and more precise control of both the temperature of the treatment as well as selective and localized application of heating.

FIG. 1 depicts an illustrative Radiative Polarity Conversion (RPC) apparatus 2 in a partially-exploded perspective view. RPC apparatus 2 can be considered to have two major components, a media treatment assembly 4, and a base assembly 6.

Media Treatment Assembly

Figure 2:
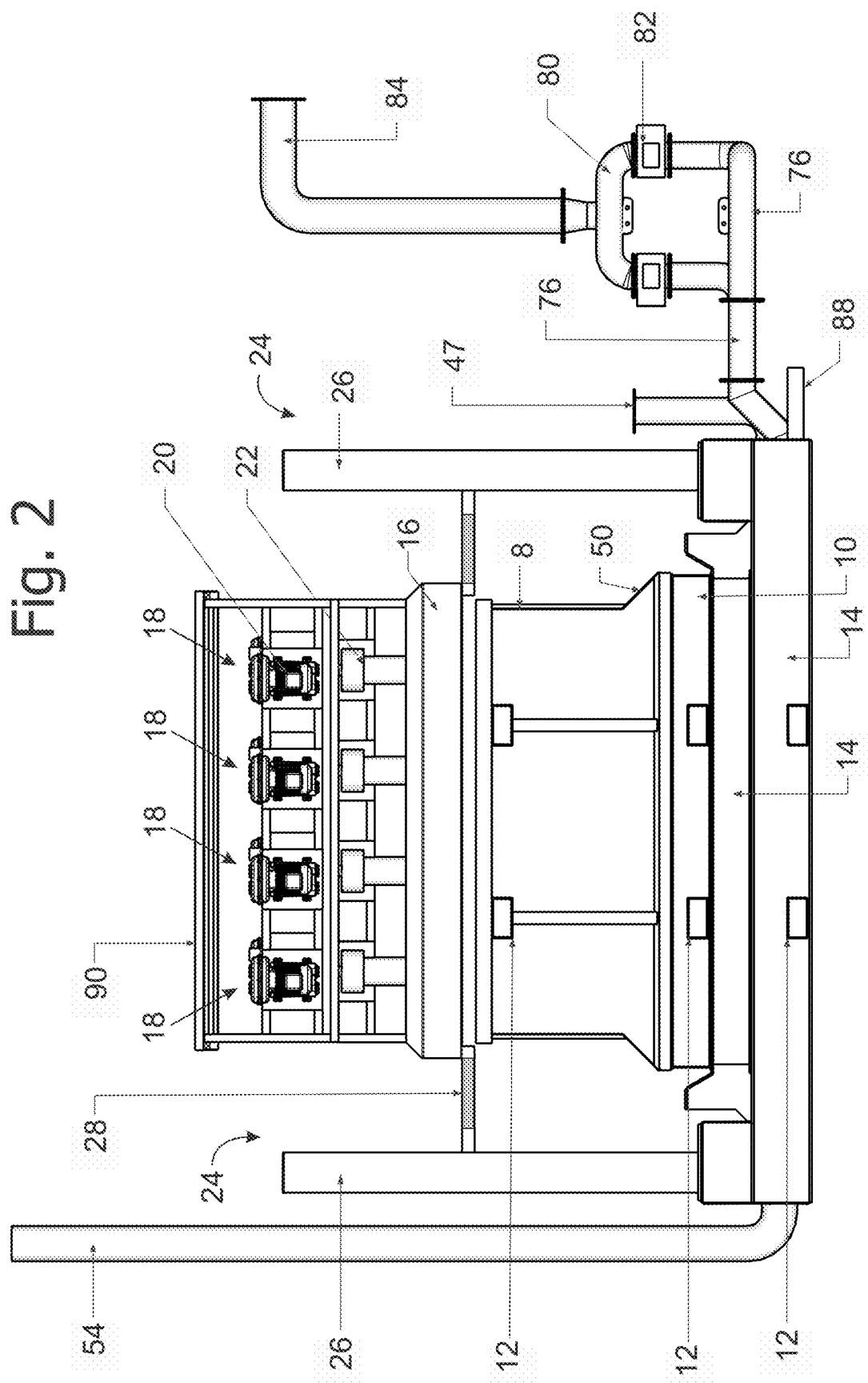
FIG. 2 is a side elevation view of the RPC apparatus of FIG. 1.
Figure 3:
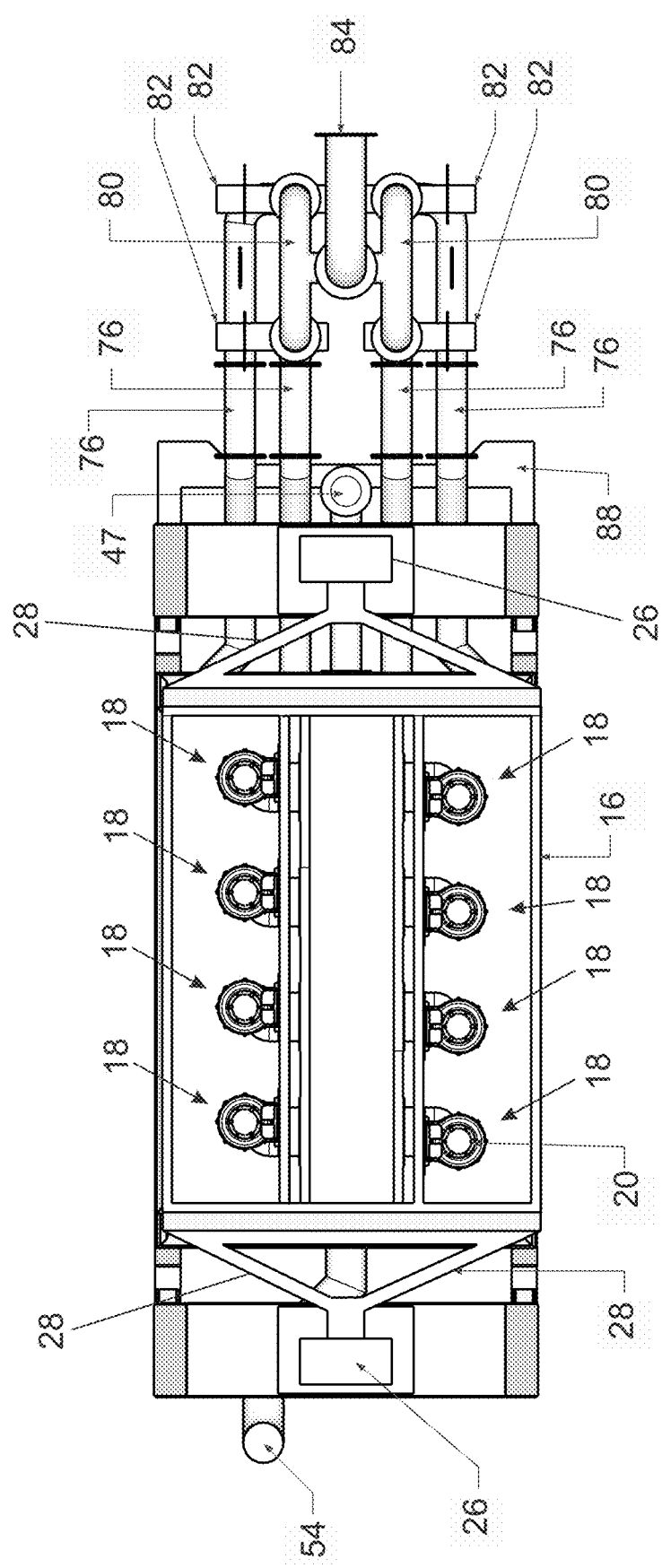
FIG. 3 is a plan view of the RPC apparatus of FIG. 1.
Figure 4:
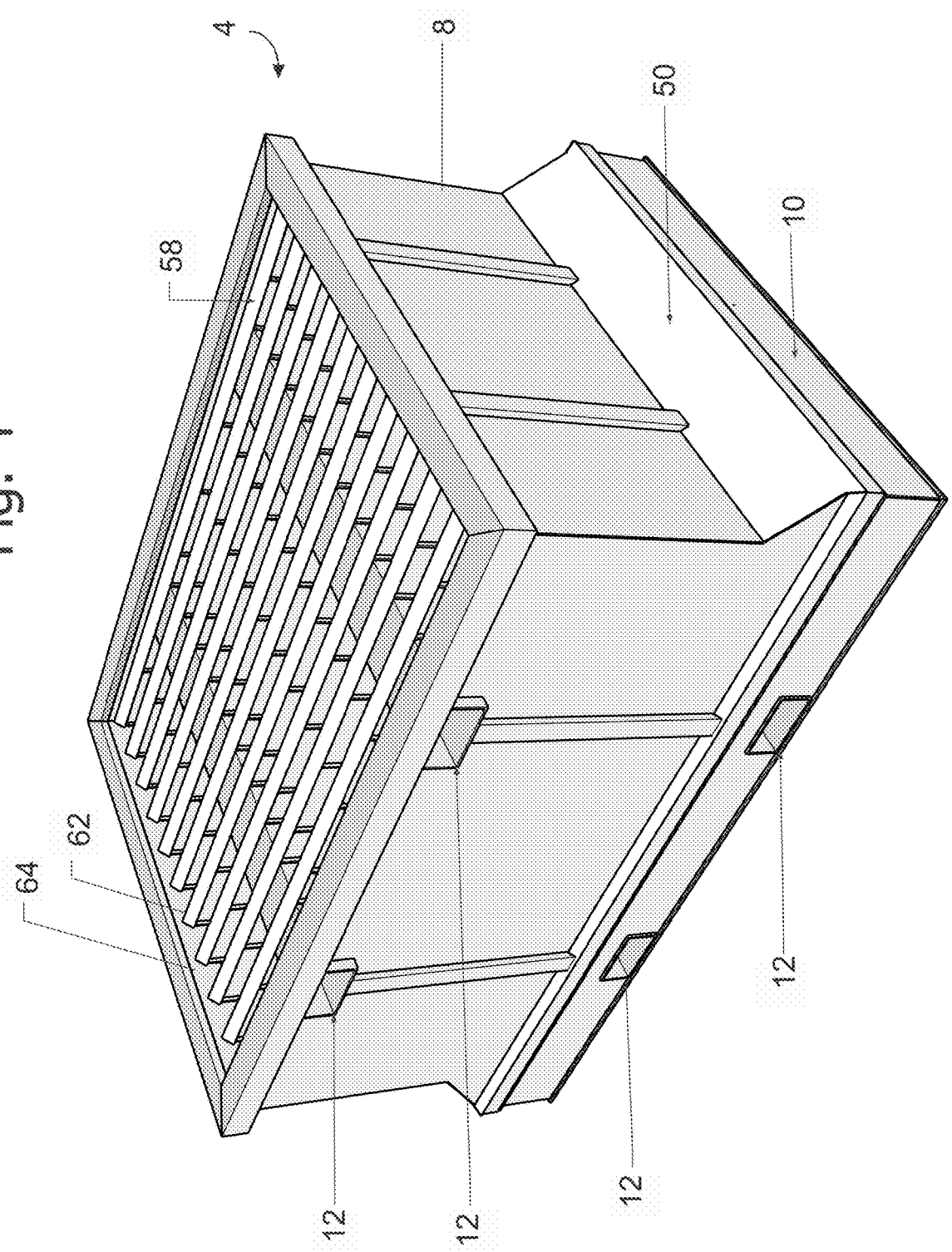
FIG. 4 is a perspective view of an illustrative media treatment assembly according to the present disclosure.

Media treatment assembly 4 is the portion of the treatment apparatus in which untreated media is loaded and subsequently treated, and includes a media treatment enclosure 8 which is rests upon and is removably coupled to media treatment base 10. Media treatment enclosure 8 can be readily transported by a forklift using forklift pockets 12, and once media treatment enclosure 8 is place upon, and coupled to, media treatment base 10 (as shown in FIG. 4), media treatment assembly 4 is configured to be loaded with media that is to undergo thermal treatment via the top of media treatment enclosure 8, for example using an excavator, a backhoe, a front loader, and the like. Once media treatment assembly 4 has been loaded with the media to be treated, the media treatment assembly can be readily transported again by forklift using forklift pockets 12 in media treatment base 10, and placed on or in base assembly 6, as shown in FIG. 2.

Base assembly 6 includes a base 14, which provides support for media treatment assembly 4, as well as the necessary connections to supply heated gas to media treatment enclosure 8, or to apply vacuum to media treatment assembly 4, as will be discussed below.

Base assembly 6 additionally includes heater head assembly 16, which is configured to couple with media treatment assembly 4 by resting upon and forming a seal with media treatment assembly 4. Heater head assembly 16 additionally includes a plurality of heated treatment gas sources 18. Heated treatment gas sources can provide any desired gas or combination of gases, but typically employs ambient air that is then heated by heated treatment gas source 18. In one embodiment, each heated treatment gas source 18 includes a variable drive air blower 20 configured to impel air from outside the apparatus into media treatment assembly 4, and an adjustable electric heater 22 configured to heat the air before it is impelled into the media treatment assembly 4.

Heater head assembly 16 can be raised and lowered using heater head lifting apparatus 24, which is another component of base assembly 6. Heater head lifting apparatus 24 includes a pair of vertical supports 26 mounted to base 14, and lifting arms 28, where lifting arms 28 are coupled directly to heater head assembly 16, and movably coupled to supports 26. By lowering and raising lifting arms 28 on supports 26, heater head assembly 16 can be placed onto, and removed from, media treatment assembly 4.

After treatment within media treatment assembly, treated media can be unloaded from media treatment assembly 4 by simply removing the entire media treatment assembly 4 from base assembly 6 and transporting it to another location where the media treatment assembly 4 is placed on the ground. By raising media treatment enclosure 8 from media treatment base 10, the now-treated media falls through media treatment enclosure 8 and onto media treatment base 10. The now empty media treatment enclosure 8 is removed, and media treatment base 10 can be raised using a forklift, thereby shedding the treated media on media treatment base 10. Media treatment base 10 can then be placed in another location, and media treatment enclosure 8 can be placed upon and coupled to media treatment base 10, placing media treatment assembly 4 into condition for another load of media to be treated to be placed within the assembly.

Thermal Jacket

Figure 5:
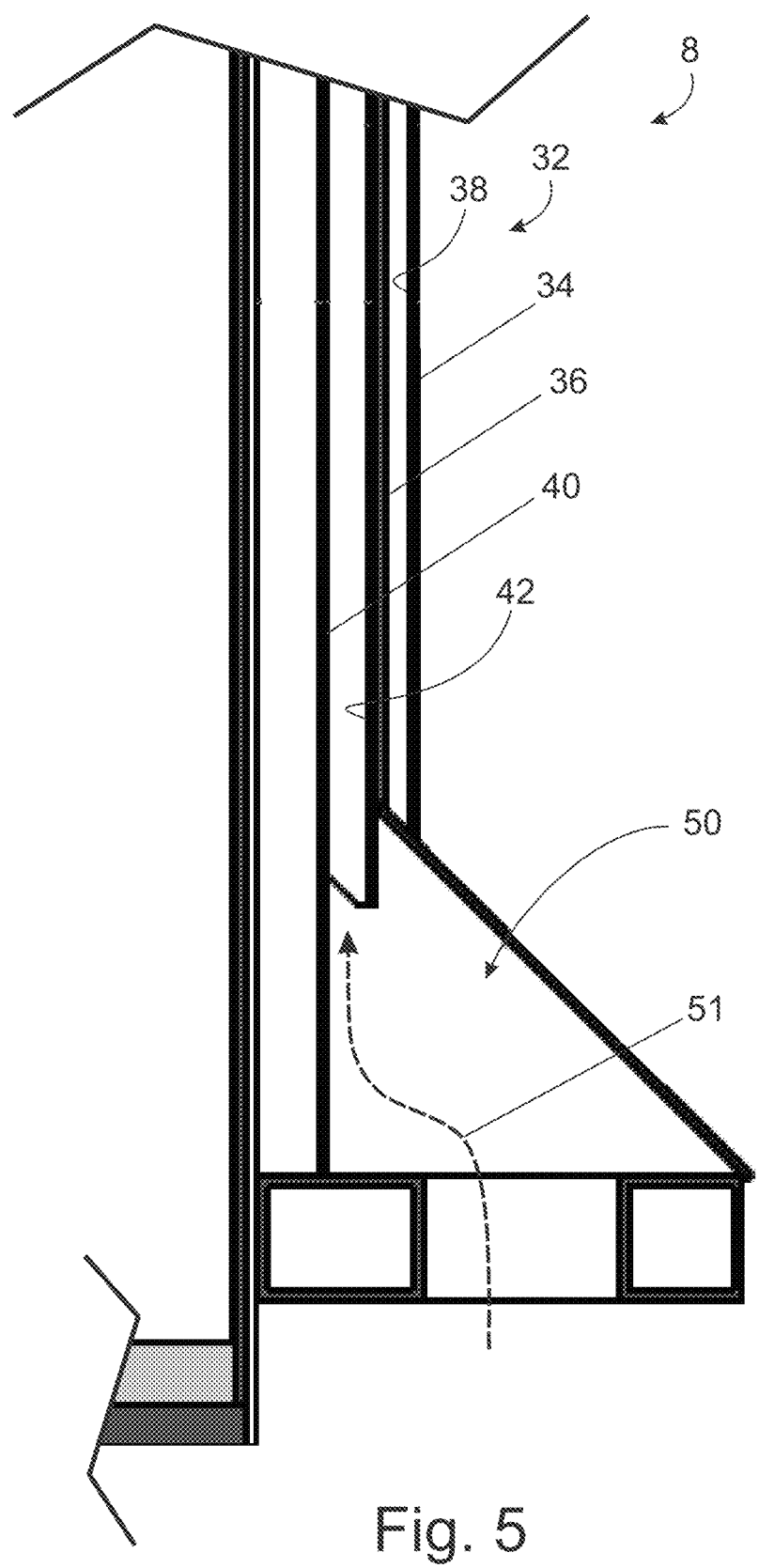
FIG. 5 is a partial cross-sectional view of a sidewall of an illustrative media treatment enclosure according to the present disclosure.

As shown in FIG. 5, media treatment enclosure 8 is constructed so that the exterior sidewalls 30 of the soil slip assembly create a thermal jacket 32 that surrounds the interior volume of media treatment enclosure 8. This thermal jacket 32 is composed of three discrete wall structures within sidewalls 30 that define two separate internal volumes. The outermost wall structure 34 and the intermediate wall structure 36, in combination, define an intermediate air gap 38 that encloses the sides of media treatment enclosure 8, providing thermal insulation for the interior volume of media treatment enclosure 8. Similarly, the intermediate wall structure 36 and an inner wall structure 40, in combination, define a heated inner jacket 42 that surrounds the interior of media treatment enclosure 8 on each side, where inner jacket 42 is configured so that heated polar gases can be circulated throughout the inner jacket, thereby heating the media undergoing treatment within media treatment enclosure 8.

The use of thermal jacket 32 provides a means to deliver radiative, non-contact heating to the shaped media bed inside the media treatment enclosure. At the same time, the thermal jacket provides a means to recover the heat of exhaust gases from portable generators, or other combustion engines, by circulating their exhaust gases through the annular inner jacket in the sidewalls of the media treatment enclosure.

In order to maximize the radiant heat emission of the thermal jacket, intermediate wall structure 36 can be manufactured to exhibit a thermal emissivity that is as close to zero as possible, so that radiative heat from the heated polar gas circulating within inner jacket 42 is efficiently reflected into the interior of media treatment enclosure 8. Similarly, inner wall structure 40 can be manufactured with a thermal emissivity as close to one as possible, to absorb radiative heat into media treatment enclosure 8. In this way, the efficiency of the radiative heating of the media within the thermal jacket is maximized.

Figure 6:
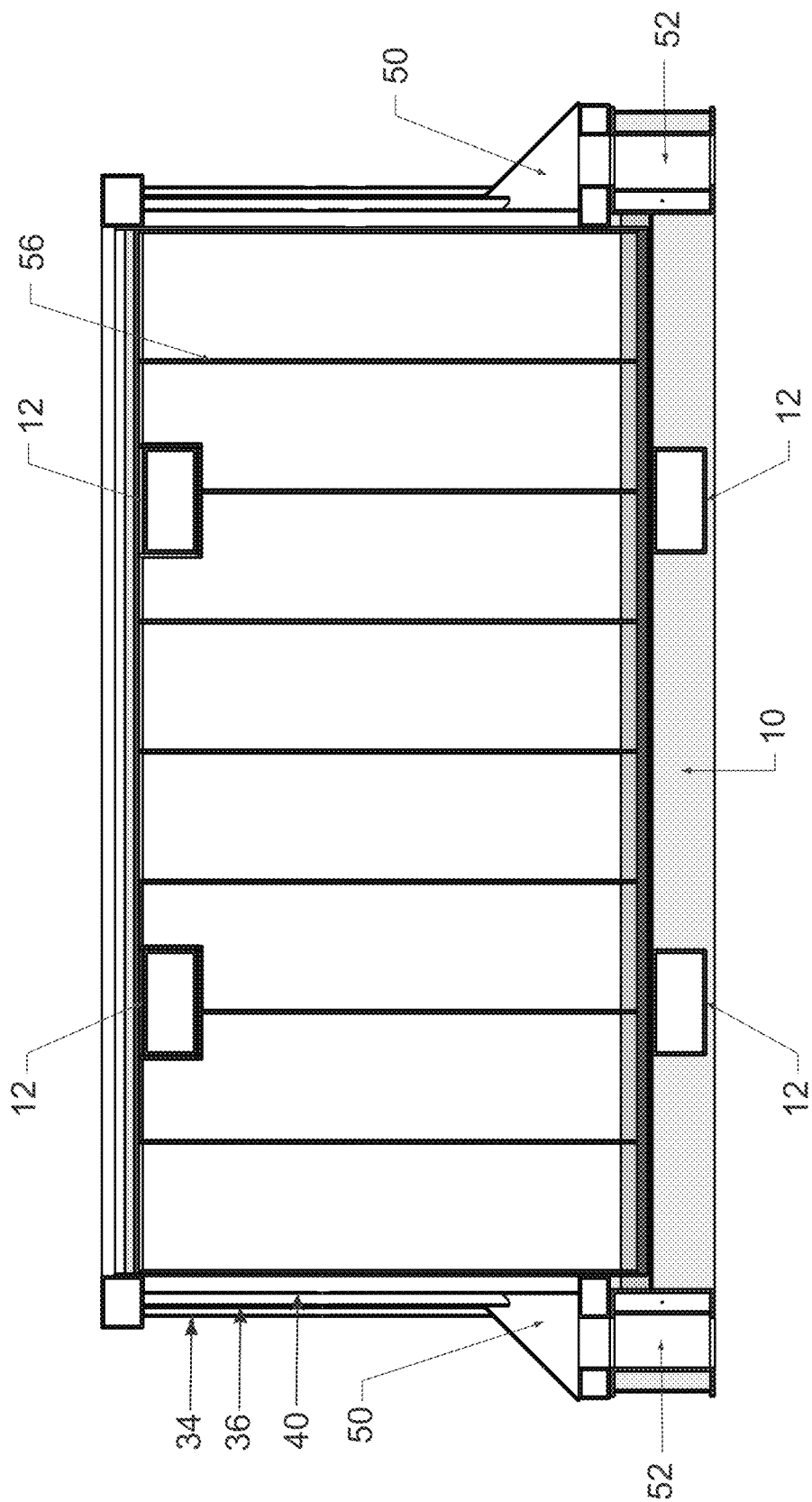
FIG. 6 is a cross-section view through the inner jacket of a sidewall of an illustrative media treatment enclosure according to the present disclosure.
Figure 7:
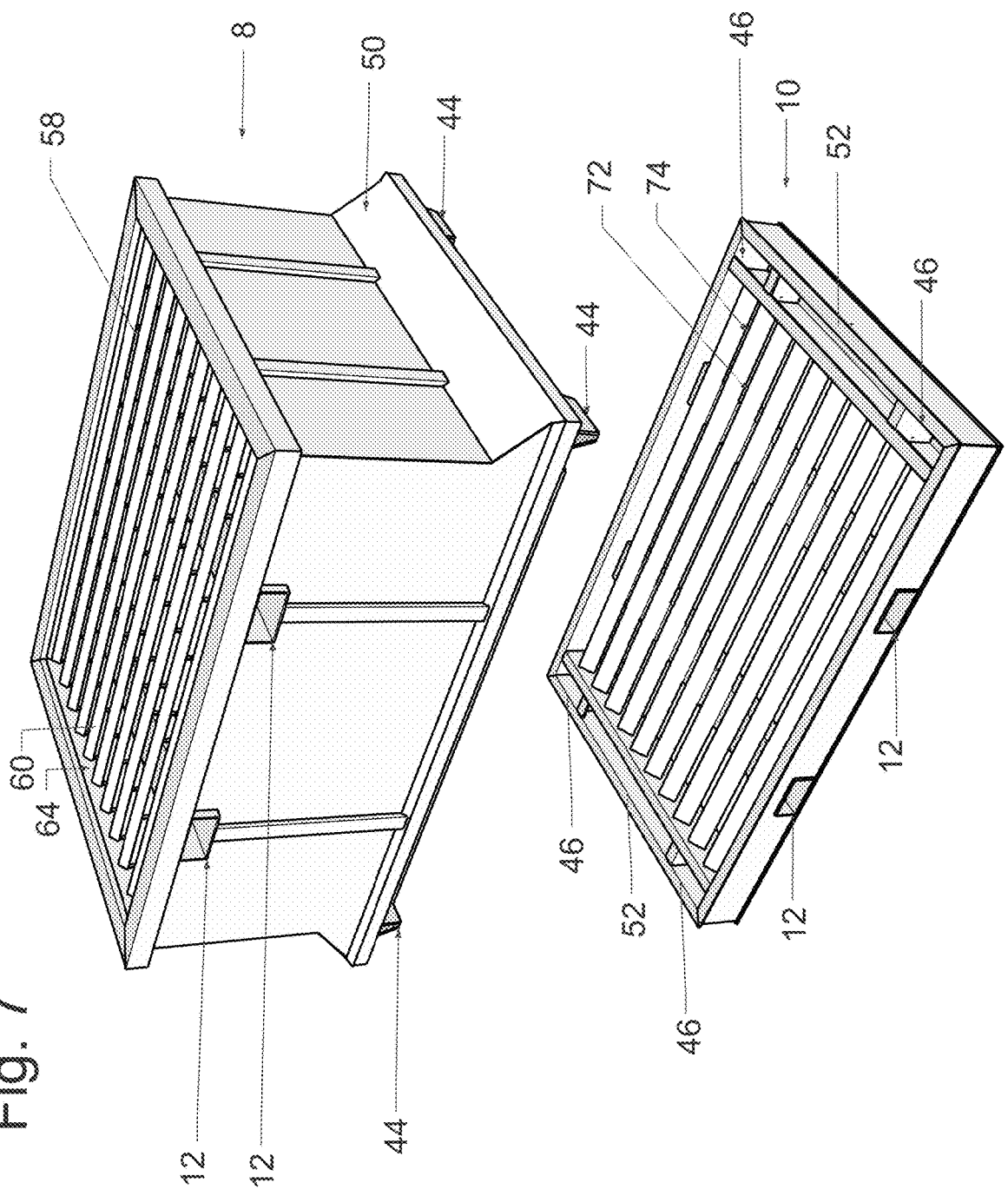
FIG. 7 is a perspective view of the media treatment assembly of FIG. 4, showing the media treatment enclosure raised above the media treatment base.
Figure 8:
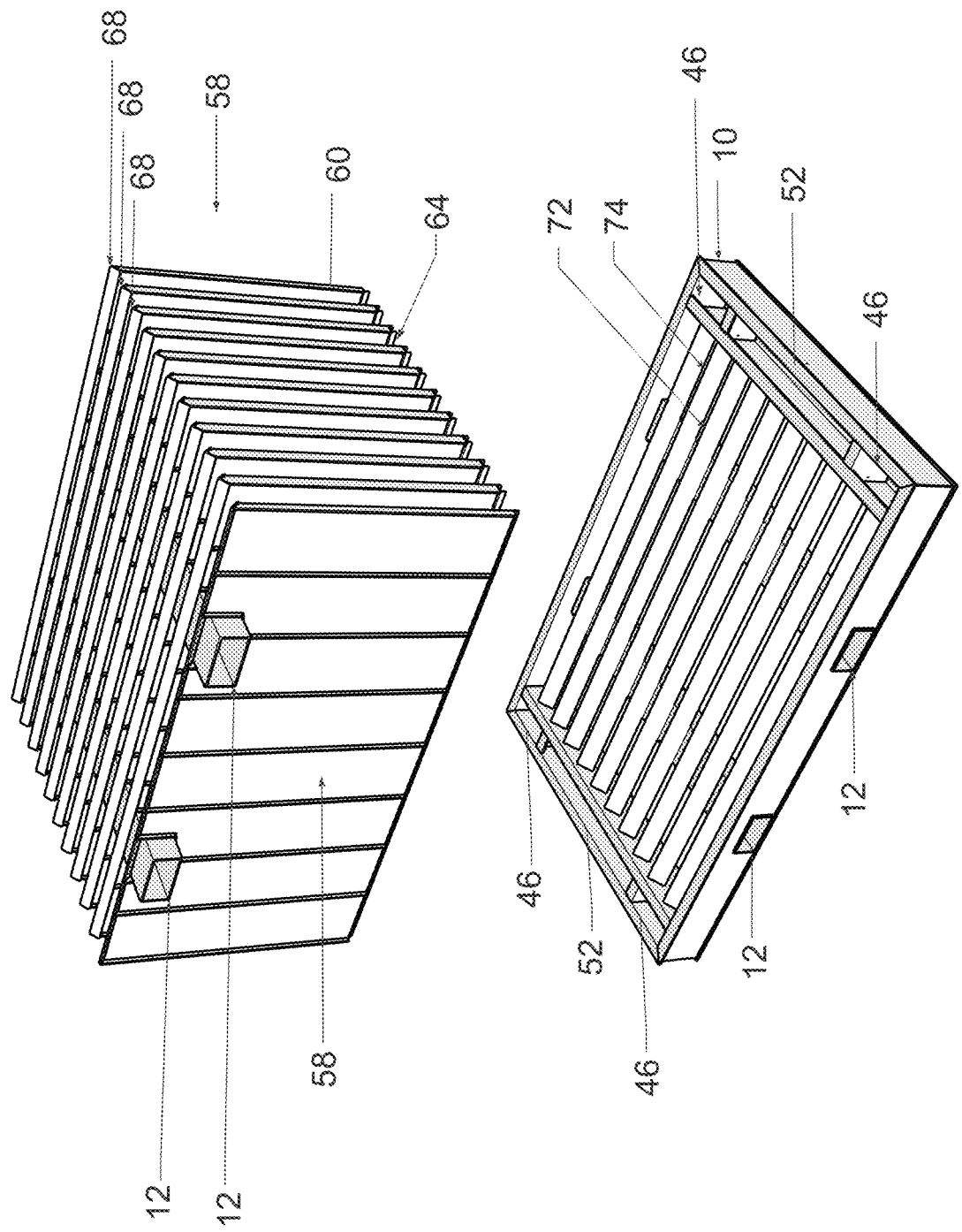
FIG. 8 is a perspective view of the porous channel assembly and the media treatment base of FIG. 7.

Selected details of the coupling and interface between media treatment base 10 and media treatment enclosure 8 are shown in FIGS. 6 and 7. Media treatment enclosure 8 can be properly aligned with media treatment base 10 by the insertion of downwardly projecting alignment tabs 44 at the lower corners of media treatment enclosure 8 into corresponding recesses 46 at the corners of media treatment base 10. The interaction between alignment tabs 44 and recesses 46 ensures that the media treatment enclosure 8 is properly aligned with and secured to media treatment base 10. Once media treatment enclosure 8 and media treatment base 10 are aligned and coupled, the weight of media treatment enclosure 8 (and the media within the media treatment enclosure) make the connection with media treatment base 10 secure.

Heated polar gas can be delivered to base 14 of base assembly 6 via heated polar gas coupling 47 (as shown in FIGS. 1 and 2). Once media treatment enclosure 8 is placed in proper alignment on media treatment base 10, heated polar gas can be delivered to media treatment base 10 from base 14 via heated polar gas port 48, which couples to media treatment enclosure via a manifold 50 that directs the heated polar gas into inner jacket 42 within sidewalls 30 (see arrow 51 of FIG. 5). Manifold 50 includes a rectangular port 52 in media treatment base 10 that in turn is coupled to heated polar gas port 48 in base 14, and to conduit 46 in media treatment enclosure 8 that couples rectangular port 52 to inner jacket 42 (as shown in FIGS. 6 and 7). After circulating around media treatment enclosure 8 within inner jacket 42, the polar gas exits media treatment enclosure 8 via a symmetrically-disposed conduit 46 and rectangular port 52 in an opposing end of media treatment assembly 4, and then exits to the atmosphere through polar gas exhaust stack 54, via polar gas exit 49 in base 14 (as shown in FIGS. 1 and 2).

As shown in FIG. 6, the space within inner jacket 42 can include one or more flow disruption features 56. Typically, flow disruption features 56 are disposed on the surface of inner wall structure 40 within the inner jacket. Flow disruption features 56 can be configured to create turbulence in the heated polar gas flow that breaks up the boundary layer in the flow of heated gas through inner jacket 42, which in turn lowers the thermal resistivity of interior wall 40. The lowered thermal resistivity can then facilitate more efficient heat transfer from the circulating heated gas into the interior of media treatment enclosure 8.

The use of polar gases for the heated gases circulated within thermal jacket 32 provides additional advantages, as polar gases more effectively absorb, store, and re-emit radiative heat. In addition, the specific type of polar gas used can be tailored so that the gas molecules emit infrared radiation in a desired wavelength range, and in particular in wavelength ranges that enhance desorption of specific contaminants from the media undergoing treatment.

By constructing media treatment base 10 and media treatment enclosure 8 so that they independently exhibit a central plane of symmetry, the operability of RPC apparatus 2 is guaranteed regardless of the orientation of either the media treatment base 10 or media treatment enclosure 8 when they are coupled, filled, and placed into RPC apparatus 2.

By heating media treatment enclosure 8 using heated polar gas via thermal jacket 32, radiative heat can be delivered to the media undergoing treatment without the heating gases encountering the media being treated. This translates directly into lower direct treatment gas volume delivery, and therefore lower operational costs.

Porous Channel Assembly

Media treatment assembly 4 can additionally include a porous channel assembly 58 within sidewalls 30 of media treatment enclosure 8, although for the sake of clarity porous channel assembly 58 is shown in isolation in FIGS. 8-12. Porous channel assembly 58 is configured to create porous channels in media undergoing treatment, so that a heated treatment gas can flow through the resulting porous channels and thereby achieve maximized interaction with the media undergoing treatment within media treatment enclosure 8.

Figure 12:
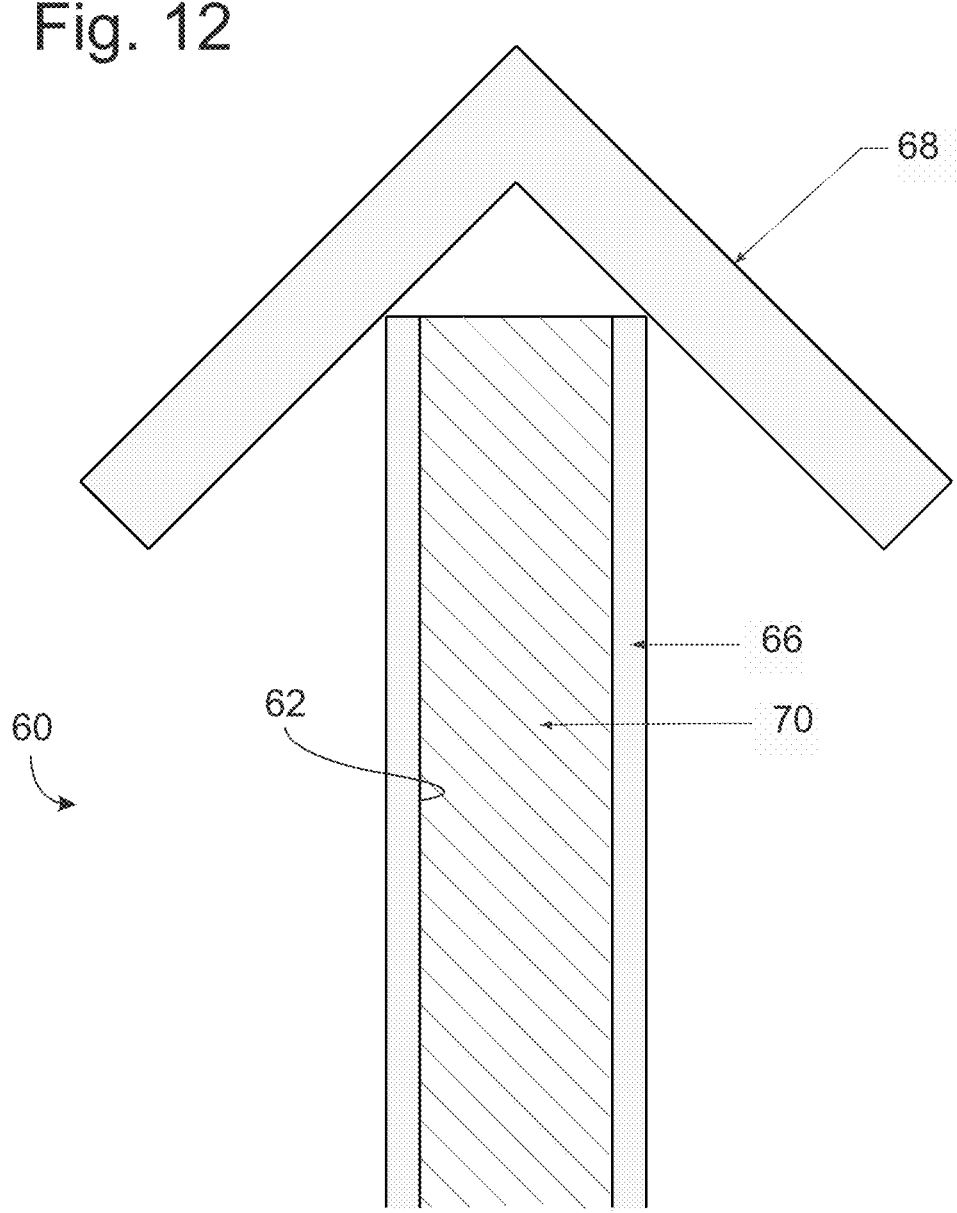
FIG. 12 is a cross sectional view of an upper portion of an illustrative porous structure according to the present disclosure.
Figure 13:
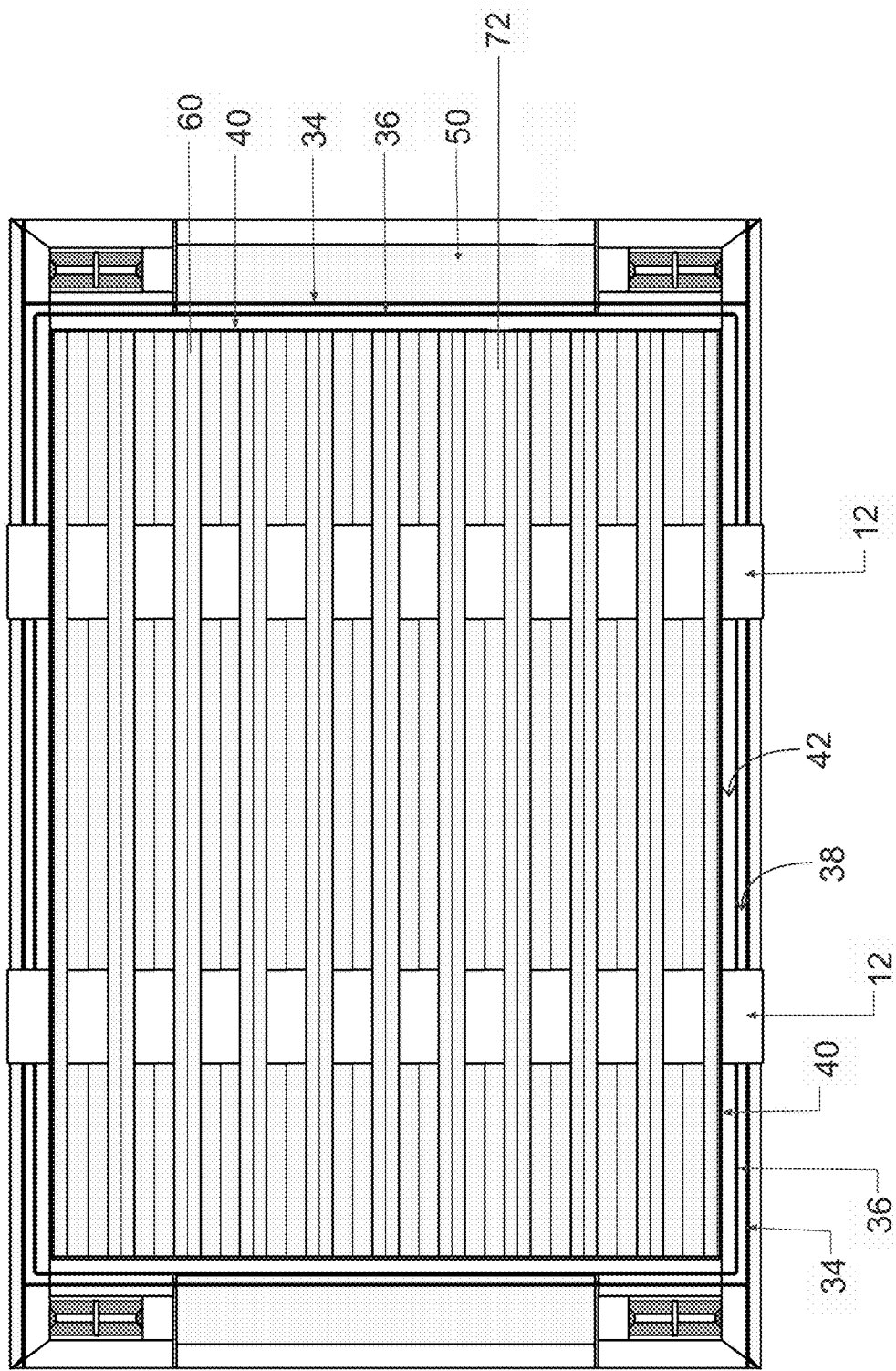
FIG. 13 is a plan view of the media treatment assembly of FIG. 4.

Porous channel assembly 58 typically includes a plurality of porous structures 60, where each structure 60 defines an internal channel 62, for example as shown in FIG. 12. In the simplest example, porous structures 60 are hollow, and treatment gas can pass through the interior channels defined by the porous structures.

The material used to form structures 60 should be highly porous with respect to the heated treatment gas to be used, such as for example a mesh, screen, or a perforated sheet material. At the same time, structures 60 should also exhibit sufficient strength to withstand the pressure of the media loaded into media treatment enclosure 8 without being compressed. In one example, porous structures 60 are defined by shaped metal sheets that have been perforated so as to provide efficient heat transfer and transfer of contaminants from the media under treatment to the treatment gas.

The structures 60 of porous channel assembly 58 can have any configuration that creates suitable channels 62 for treatment gas within the media undergoing treatment. The channels 62 formed within the media treatment enclosure 8 can have the form of individual continuous channels (that can be substantially straight or substantially nonlinear), but more typically the porous channel assembly 58 employs one or more screen or mesh structures 60 to form parallel, vertically-oriented and substantially planar channels 62 in the media to be treated. In one aspect of the RPC apparatus, the channels 62 defined by porous channel assembly 58 are referred to as "air gaps".

Similarly, the spacing and orientation of structures 60 can define a plurality of vertical spaces 64 between adjacent structures 60. These vertical spaces 64 are configured to be filled with the media that is intended to undergo thermal treatment within the RPC apparatus 2, and may be referred to as "media channels", "soil gaps", or any other label. It should be appreciated, however, that during use the gaps or spaces 64 between structures 60 are not empty, as they are filled with the media undergoing treatment.

Figure 9:
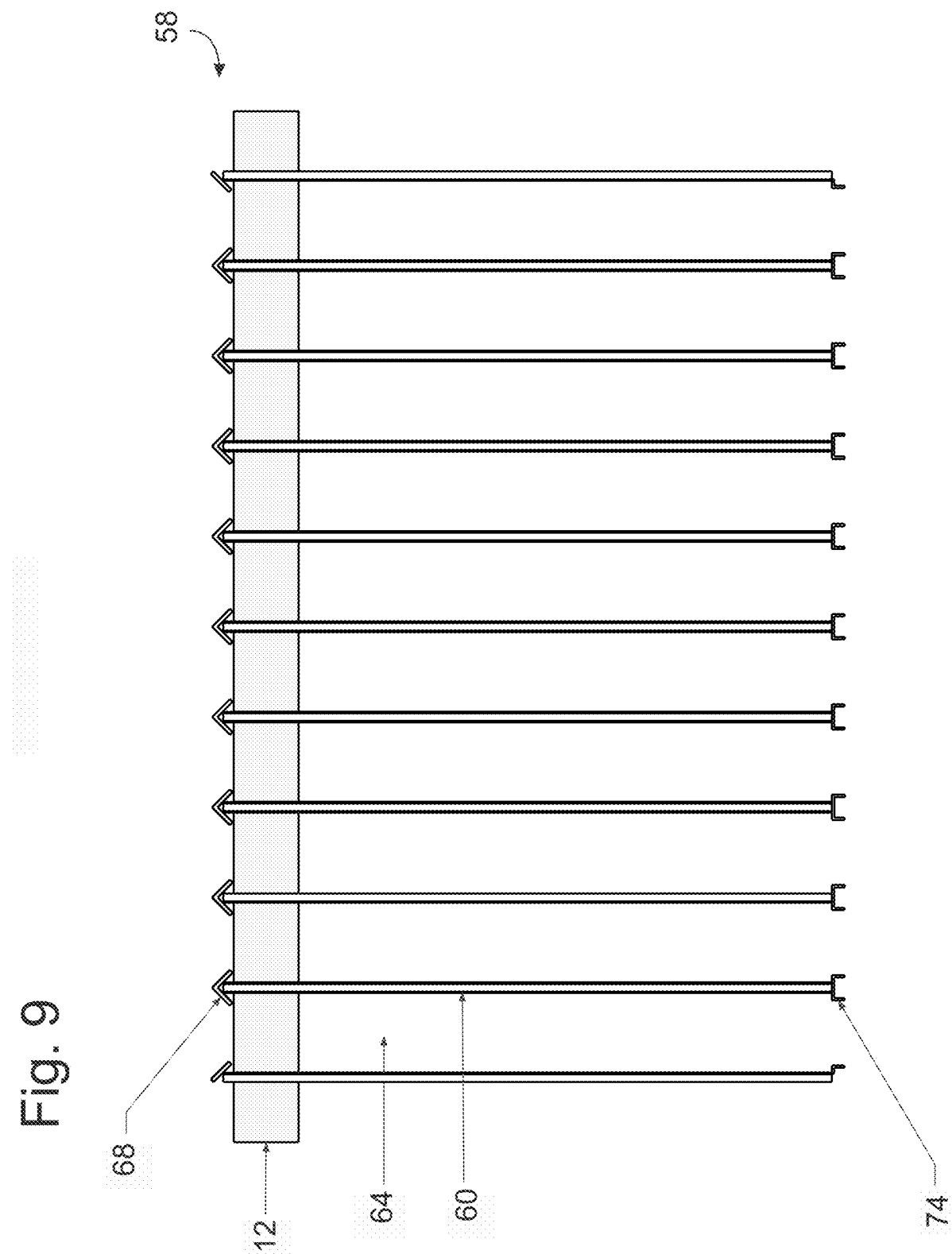
FIG. 9 is a cross sectional view of the porous channel assembly of FIG. 8.
Figure 10:
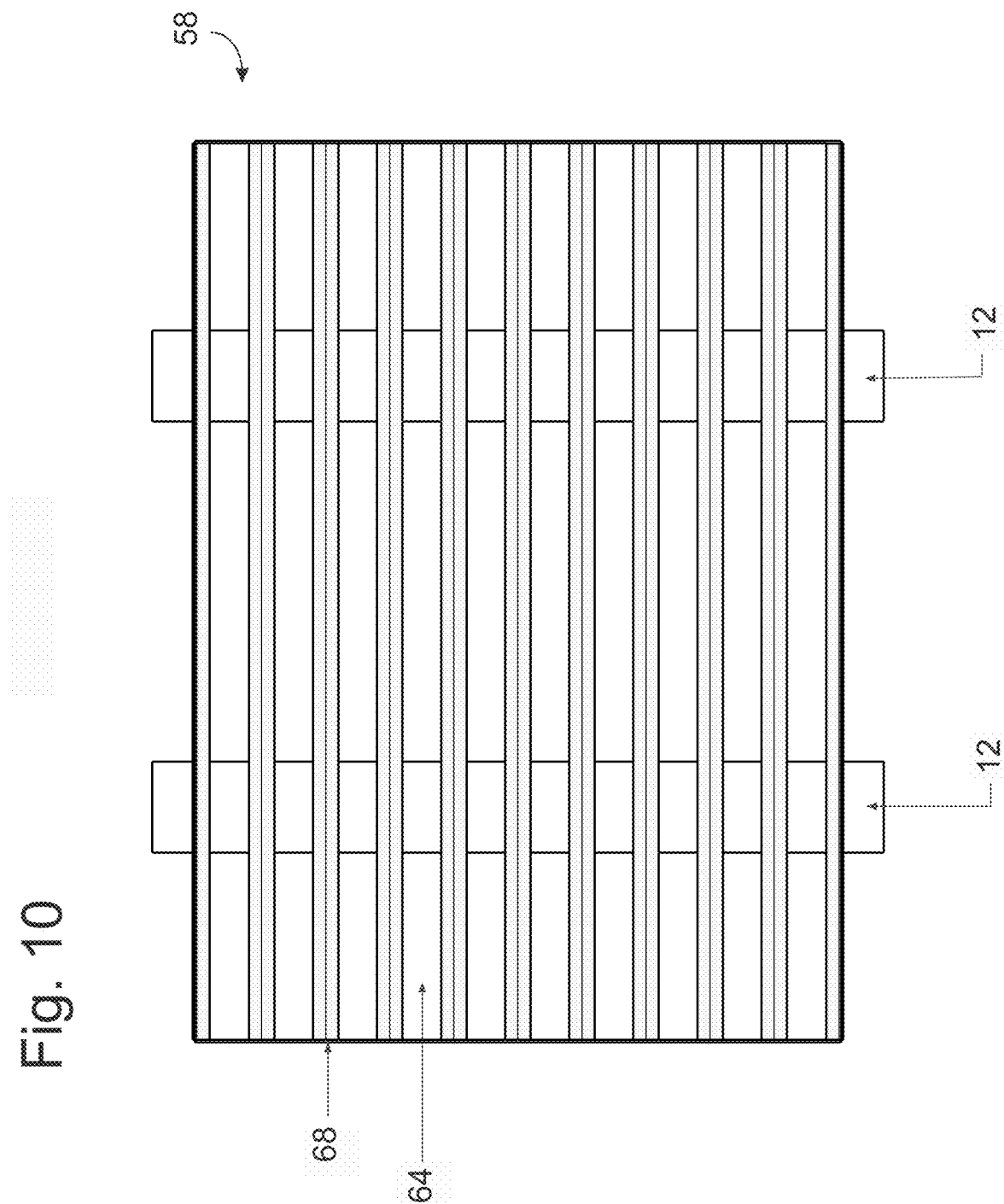
FIG. 10 is a plan view of the porous channel assembly of FIG. 8.
Figure 11:
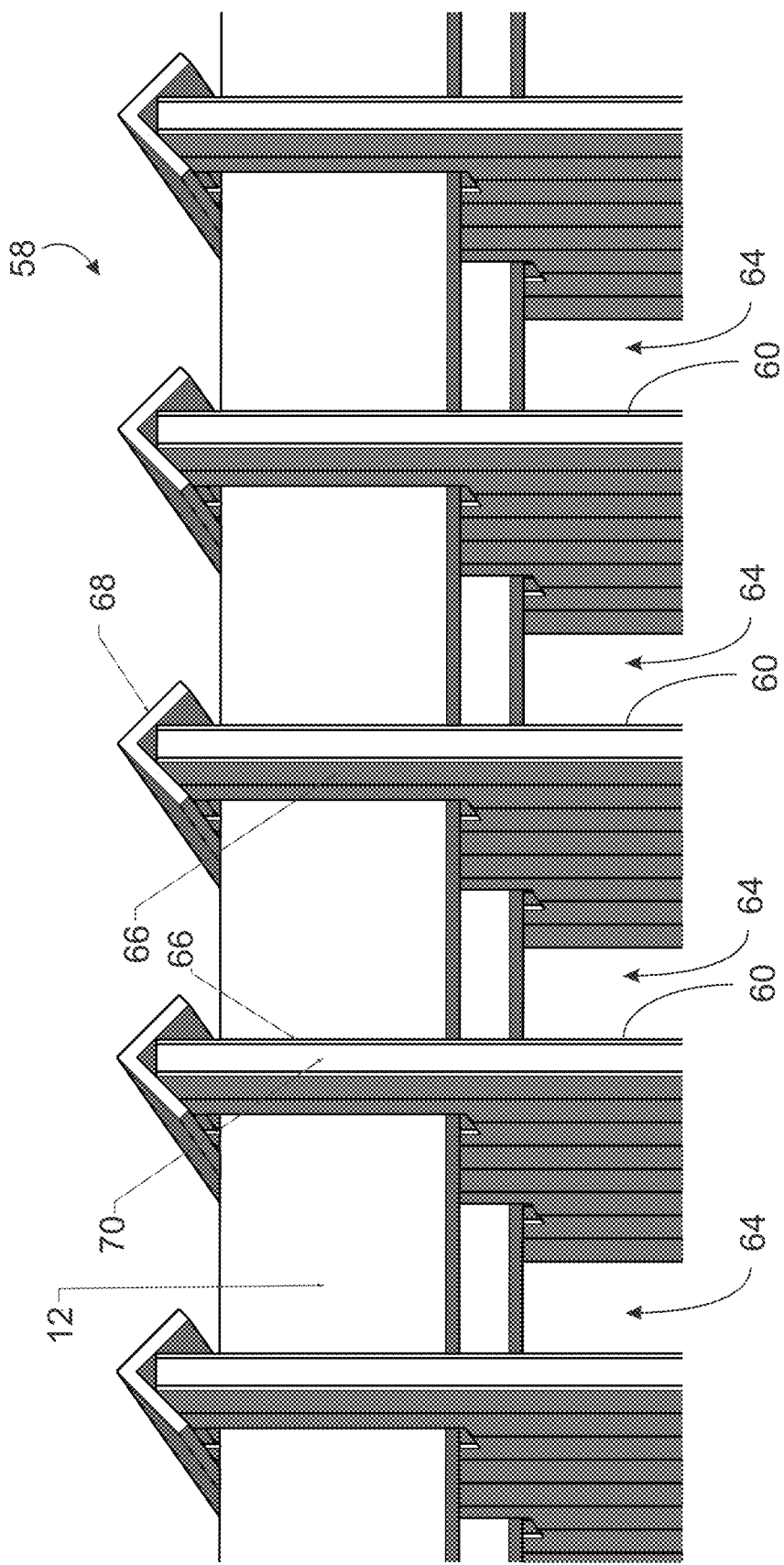
FIG. 11 is a perspective view of a detail of the porous channel assembly of FIG. 8.

Porous channel assembly 58 is shown in cross section in FIG. 9, and in plan view in FIG. 10. Each forklift pocket 22 is shown to extend across the width of porous channel assembly 58, and forklift pockets 22 provide a support to which structures 60 can be attached. As shown, each of structures 60 defines an internal channel 62 through which treatment gas can flow, while pairs of adjacent structures 60 define vertical spaces 64. In one embodiment, each structure 60 is formed by opposing and substantially parallel porous plates 66, such that the space between adjacent pairs of plates 66 defines vertical channel 62. Porous plates 66 can be configured so that treatment gas flowing through channel 62 is able to readily pass through and contact the media undergoing treatment, while still substantially preventing the media from entering structure 60 and interfering with treatment gas flow.

As shown in FIGS. 9, and 11-13, each structure 60 can be capped by a cover 68 configured to prevent media from infiltrating the channels 62 defined by structure 60 during top loading of media treatment enclosure 8. Covers 68 can have any suitable physical configuration, but in one embodiment covers 68 are peaked so as to more readily shed media as it is loaded onto porous channel assembly 58. Each structure 60 can additionally be coupled to a structure base 69 which is configured to provide a connection between each internal channel 62 and base assembly 16 through which treatment gas can be supplied to media treatment enclosure 8.

The heated gas treatment of media using RPC apparatus 2 may be more effective when channels 62 are partially or substantially filled with a thermal media 70 to facilitate heat transfer from the heated treatment gas flowing through channels 62 to the media undergoing treatment. For example, as shown in the cross-section view of FIG. 12, the vertical structure 60 defines internal channel 62, which encloses, or is partially or fully filled by, thermal media 70. The use of thermal media can help to maximize the heated area per unit volume of the media undergoing treatment.

Thermal media 70 should be selected to facilitate heat transfer from the heated treatment gas flowing through channels 62, without substantially hindering the flow of the heated treatment gas through those channels. Thermal media 70 should therefore be porous. For example, thermal media 70 can be a particulate material, such that gas can flow through interstices between adjacent particles. Alternatively or in addition thermal media 70 can be selected to have an open, or reticulated, configuration. Suitable open configurations can include, without limitation, meshes, screens, lattices, foams, and the like.

Thermal media 70 may be selected so as to exhibit a high inherent thermal conductivity, so that heat can be more efficiently transferred from the heated treatment gas to the media under treatment, as well as helping to transfer heat from thermal jacket 32. Alternatively or in addition, thermal media 70 can be configured so that gas flow and heat transfer is invariant with respect to orientation. That is, thermal media 70 can be selected to be isotropic. Employing an isotropic thermal media can help ensure that the media within media treatment enclosure 8 is heated evenly and consistently.

In particular, thermal media 70 can include and/or incorporate any of a variety of metals, including metal alloys, that exhibit a desired combination of properties, including isotropy and thermal conductivity. In one embodiment, thermal media can include a foamed metal or metal alloy. Foamed metals can be prepared by injecting a gas into the liquid metal from an external source, by causing gas formation in the liquid metal by adding a gas-releasing blowing agent to the molten metal, or by causing the precipitation of gas that was previously dissolved in the molten metal.

Where thermal media 70 includes a foamed metal, the foamed metal may be selected from metals and metal alloys that exhibit a relatively high thermal conductivity, such as foamed silver, copper, aluminum, tungsten, zinc, or alloys thereof. A variety of foamed metals are commercially available (for example from Fraunhofer IFAM, Germany, among others). In one example, thermal media 70 includes an isotropic foamed metal.

Where a thermal media 70 that is a foamed metal is used, the surface of the foamed metal may optionally be treated to alter its surface characteristics in a desirable way. Any treatment that improves the performance of a given thermal media may be an appropriate treatment, including thermal treatment, physical treatment, or chemical treatment. In one example, a thermal media 70 that is a foamed metal can be heated to form a surface oxide coating on the metal foam.

By employing thermal media 70 that includes metallic foam, the high thermal conductivity of the metal in combination with the thermal effect of water vapor produced from heating the media during treatment results in a large and efficient heating surface area and heat delivery mechanism. In addition, the use of metallic foam permits the ability to use thinner gaps for movement of the heated treatment gas, and therefore maximizes the volume available for treatment of media.

As discussed above, media treatment enclosure 8 can be coupled to base assembly 16 and then loaded from above with media to be treated. As the media to be treated is dropped onto media treatment enclosure 8, the media will be deflected by the plurality of covers 68 so that the media to be treated falls into and substantially fills vertical spaces 64. As the media to be treated falls to the bottom of each vertical space 64, it contacts a media retention tab 72, as media retention tabs 72 extend longitudinally within base assembly 16 and substantially align with vertical spaces 64, so as to retain the media within vertical space 64 for subsequent treatment.

Also within base assembly 16, a gap 74 is defined between each pairs of media retention tabs 72. The resulting gaps 74 are configured to align with the lower terminus of each porous structure 60, via the structure base 69, so that treatment gas that has passed through channels 62 within structure 60 can then exit media treatment enclosure 8 via gaps 66.

Once media treatment enclosure 8 has been placed on and/or coupled with media treatment base 10 to form media treatment assembly 4, and porous channel assembly 58 has been loaded with media to be treated, media treatment assembly 4 can be transported via forklift (or other heavy lifting equipment) and placed on and/or coupled with base assembly 6. Once media treatment assembly 4 in position, heater head assembly 16 can be lowered using heater head lifting assembly 24 until media treatment assembly 4 is capped and/or sealed by heater head assembly 16.

Treatment of media enclosed within media treatment assembly 4 includes radiative heating via the thermal jacket incorporated into media treatment enclosure 8 while heated treatment gas is supplied to media treatment assembly 4 via the air blowers 20 and gas sources 18 of heater head assembly 16. The heated treatment gas is introduced directly into the media, which has been shaped by porous channel assembly 58 and so fills vertical spaces 64, via porous structures 60 and more specifically via the porous walls of porous structures 60, such as porous plates 66.

Figure 14:
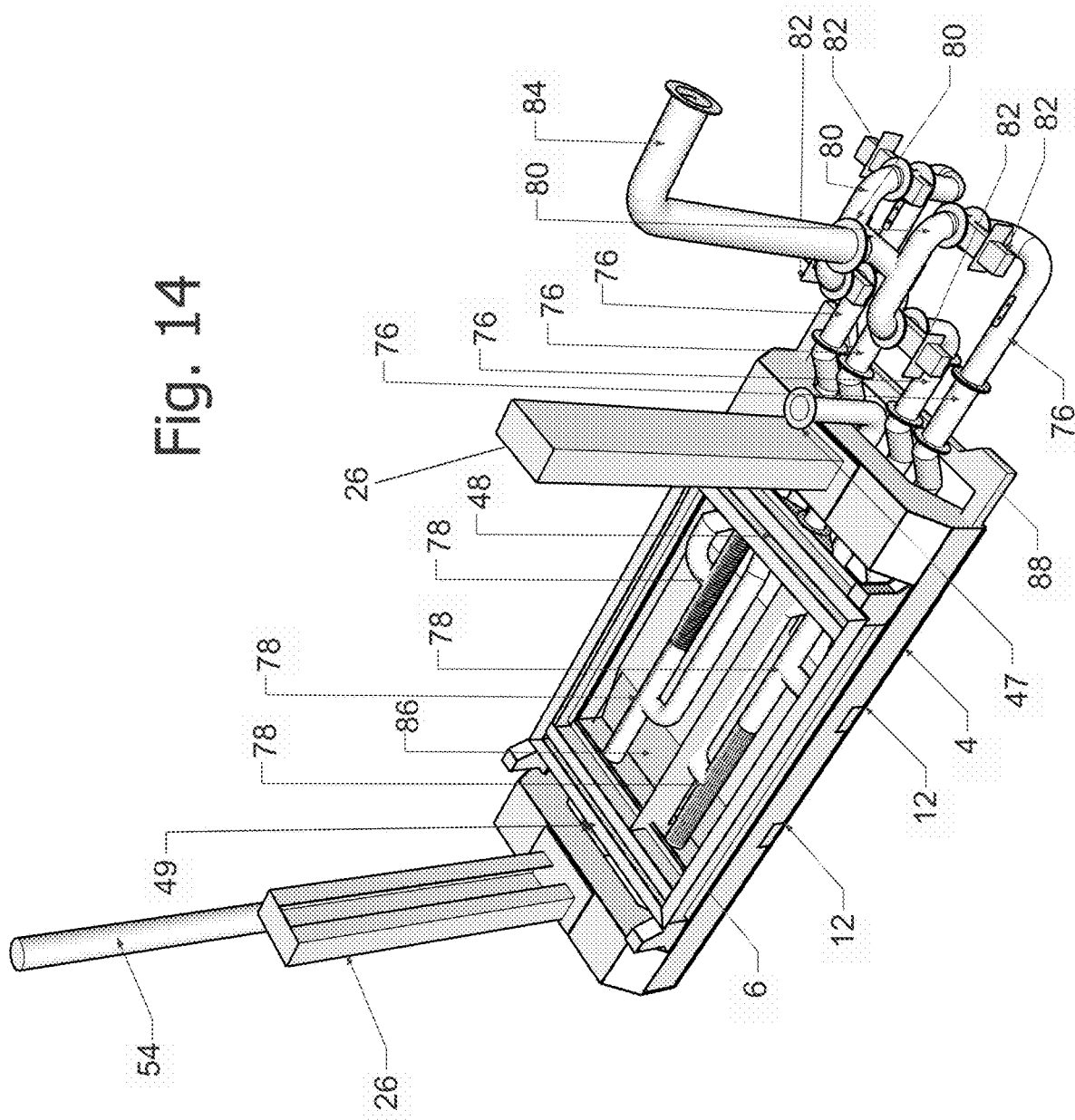
FIG. 14 is a perspective view of the base of the RPC apparatus of FIG. 1.
Figure 15:
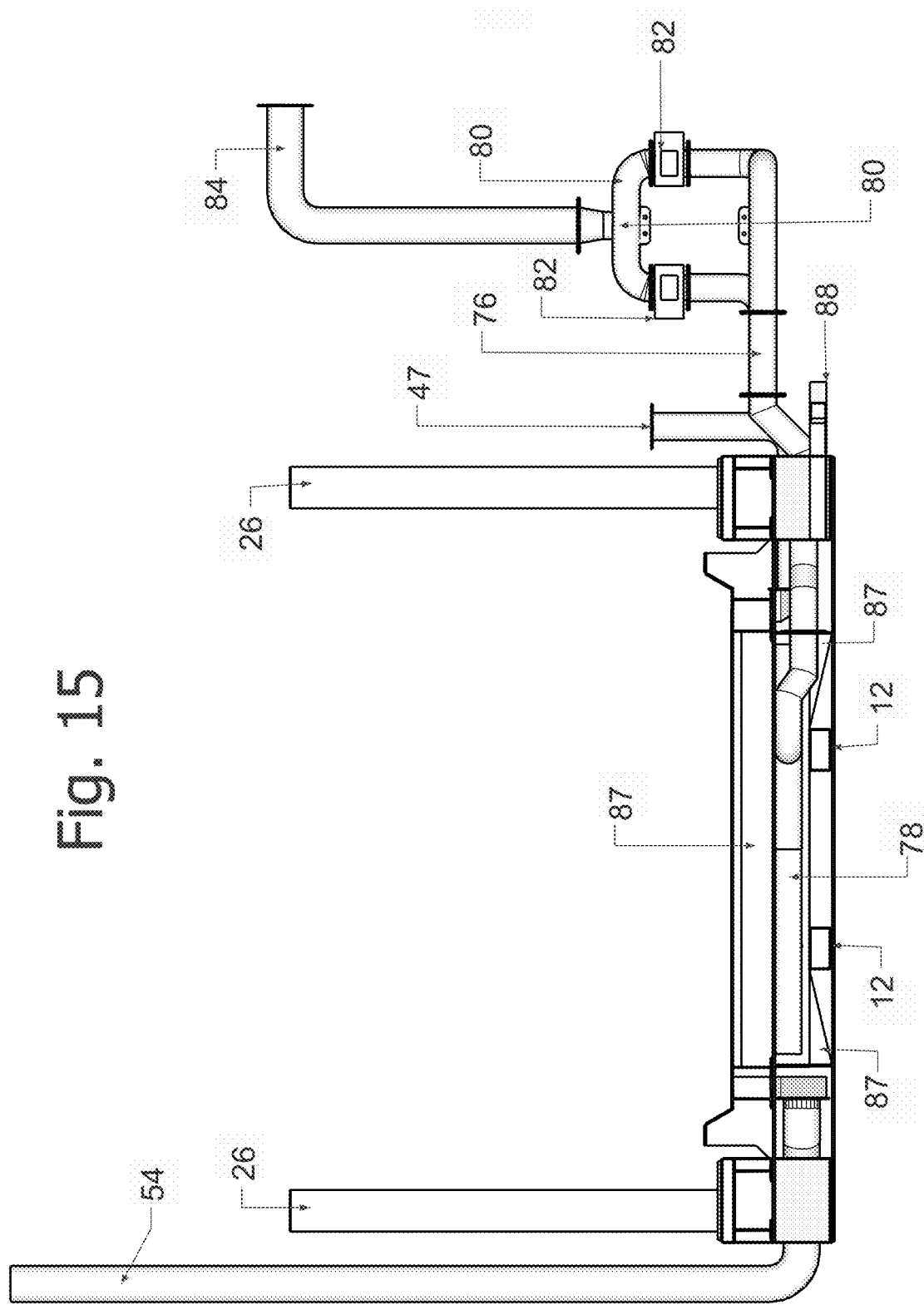
FIG. 15 is a cross sectional view of the base of the RPC apparatus of FIG. 1.
Figure 16:
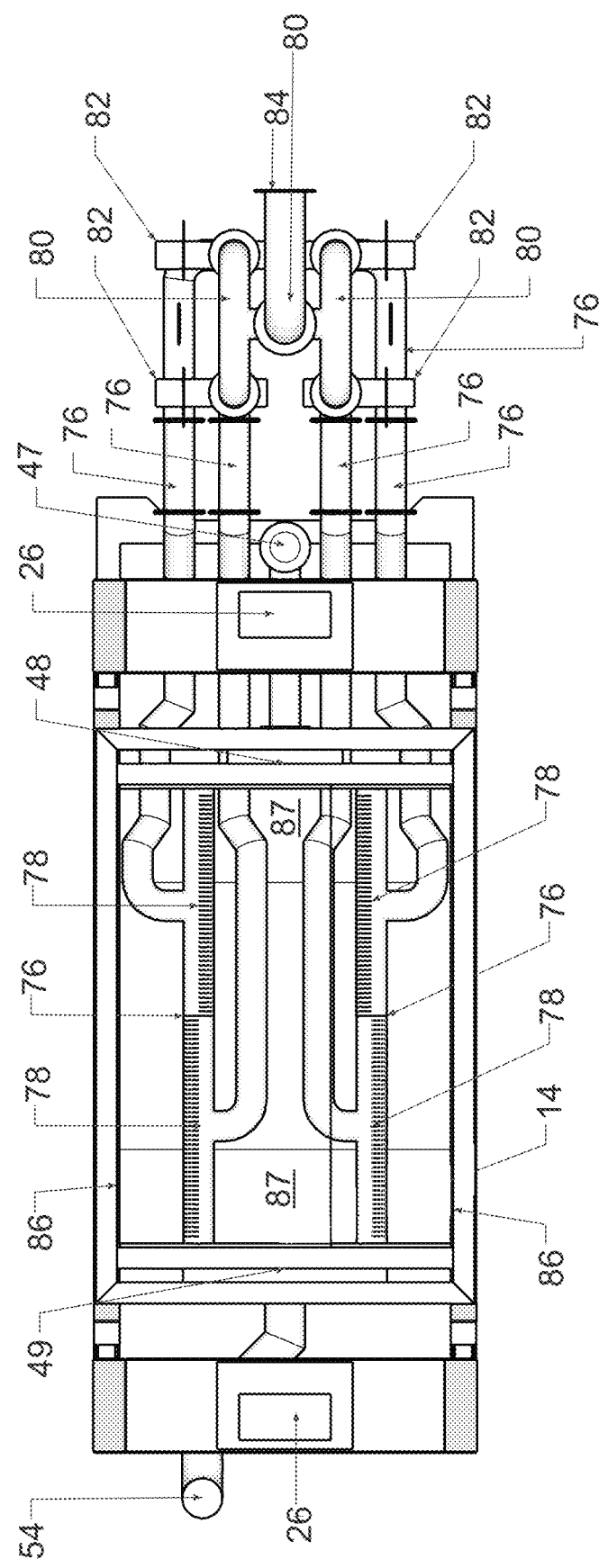
FIG. 16 is a plan view of the base of the RPC apparatus of FIG. 1.

The heated treatment gas introduced via heater head assembly 16 is simultaneously drawn from media treatment assembly 4 and into base 14 using a plurality of vacuum extraction lines 76, as shown in FIG. 14. Each vacuum extraction line 76 may include one or more extraction line screen sections 78, through which the treatment gas is drawn into the vacuum extraction line 76. Each vacuum extraction line 76 can then couple to a treatment gas extraction line manifold 80 via independent isolation valves 82. As the flow of treatment gas through RPC apparatus 2 is controlled by isolation valves 82, independent actuation of isolation valves 82 can result in focused treatment of selected individual sections of the shaped media bed within media treatment assembly 4.

Extraction line manifold 80 is configured to combine the treatment gases from each of the isolation valves 82, and route the combined treatment gases to a treatment gas extraction line 84, which in turn leads to a vapor emissions treatment system (not shown) for cooling of the treatment gas and extraction and recovery of PFAS contaminants removed from the media by RPC apparatus 2 during treatment. While a variety of appropriate vapor treatment systems can be coupled to treatment gas extraction line 84, it can be particularly advantageous to couple RPC apparatus 2 with the vapor emissions treatment system described by U.S.

application Ser. No. 16/788,650 to Brady (filed Feb. 12, 2020), hereby incorporated by reference for all purposes.

In one aspect of disclosure, gas extraction line manifold 80 to provide equidistant runs for each extraction line 76, so that an even treatment gas flow can be maintained through isolated sections of the media bed within media treatment assembly 4. Additionally, base 14 can include a treatment gas extraction chase 86 to house the vacuum extraction lines 76, in order to provide additional isolation of the treatment gas flow. This configuration can ensure an even treatment throughout the media bed by making the effective distance between the extraction point and the sectional treatment zone the same for all zones within the media treatment assembly. Additionally, this configuration provides the ability to adjust the treatment sequence so as to maximize treatment efficiency, such as for example delivering a focused heat delivery to a relatively small zone within the media undergoing treatment.

In addition to the extraction lines for collecting treatment gas beneath media treatment assembly 4, treatment gas extraction chase 86 can additionally include a granular reflective media 87 to facilitate converging treatment gas flow lines, store heat, and reflect radiative heat back into the shaped media bed inside media treatment assembly 4. The granular reflective media 87 used in treatment gas extraction chase 86 can be selected to maximize the media's absorption, storage, and re-emission of radiant heat. More specifically, granular reflective media 87 should be selected to exhibit a thermal emissivity that approaches 0, so as to more efficiently reflect radiative heat upwards to the bottom portion of the media treatment assembly.

In addition, as the converging flow lines result in a pressure differential around the vapor extraction line treatment gas exit that in turn can cause extracted contaminants having low vapor pressures compounds to condense. However, the heating due to the presence of granular reflective media 87 can prevent condensation of low vapor pressure compounds near the treatment gas exit.

As shown in FIGS. 1, 2, 14, and 15 a skid guide bumper 88 can be coupled to base 14. Skid guide bumper 88 can provide a guided connection between different skid assemblies of a treatment unit. In addition, heater head assembly 16 can include a cover or roof 90, in order to provide some protection from weather.

Method of Treating Contaminated Media

Figure 17:
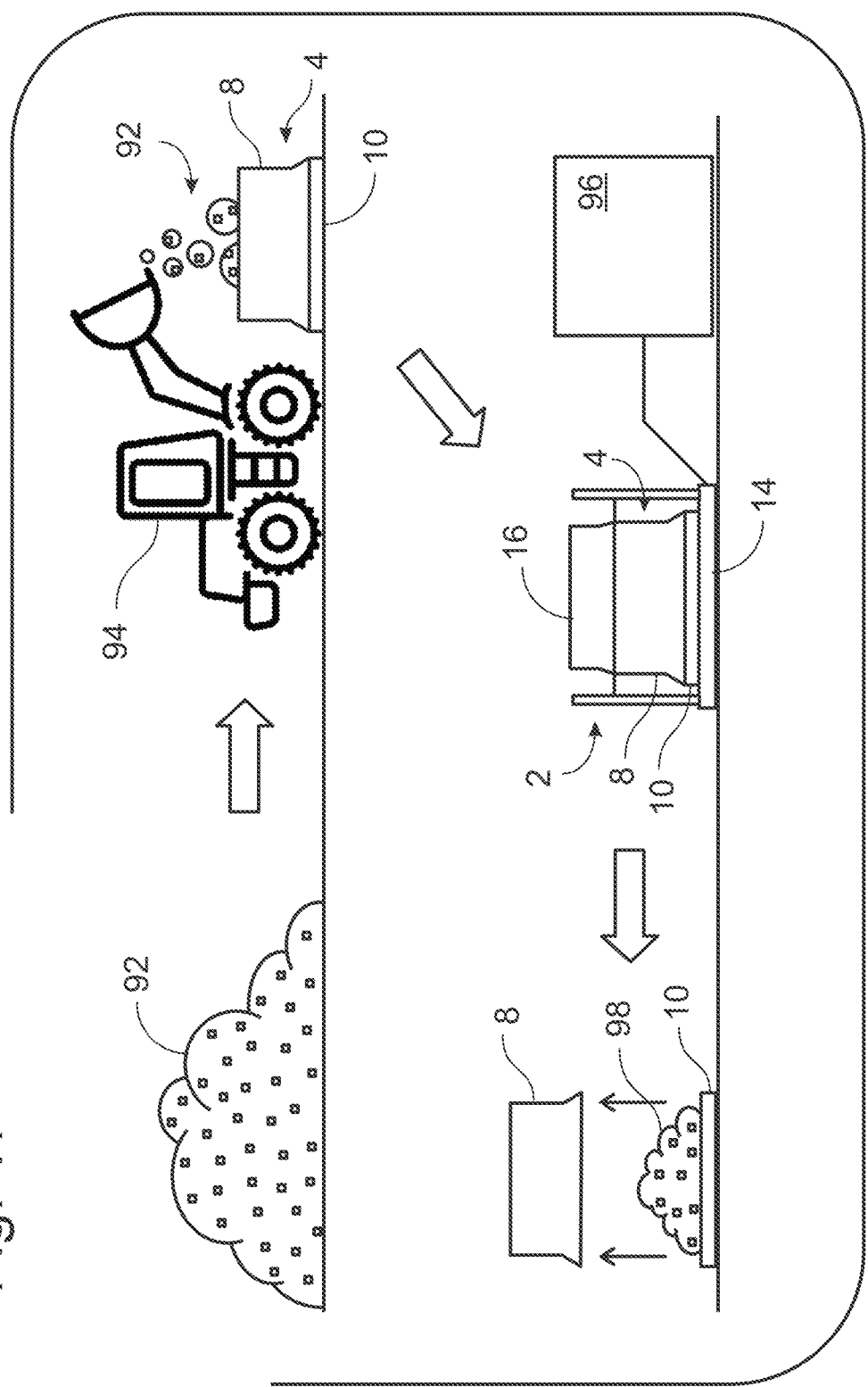
FIG. 17 is a semi-schematic diagram showing a process of treating contaminated media using an RPC apparatus according to the present disclosure.

The use of RPC apparatus 2 to treat contaminated media is depicted semi-schematically in FIG. 17. As shown, contaminated media 92 is loaded into media treatment assembly 4 using appropriate loading equipment 94. The loaded media treatment assembly 4 is then transported to and coupled with base assembly 6, and the heater head assembly is lowered onto media treatment enclosure 8. The contaminated media then undergoes treatment within RPC apparatus 2, with the extracted treatment gas routed to a vapor treatment system to collect the extracted contaminants from the extracted treatment gas. The treated media 98 is then removed from RPC apparatus 2 by transporting the media treatment assembly away from base assembly 6 and lifting media treatment enclosure 8 from media treatment base 10, which is then also removed from the treated media 98 for reassembly with media treatment enclosure 8, filling and subsequent reuse.

Figure 18:
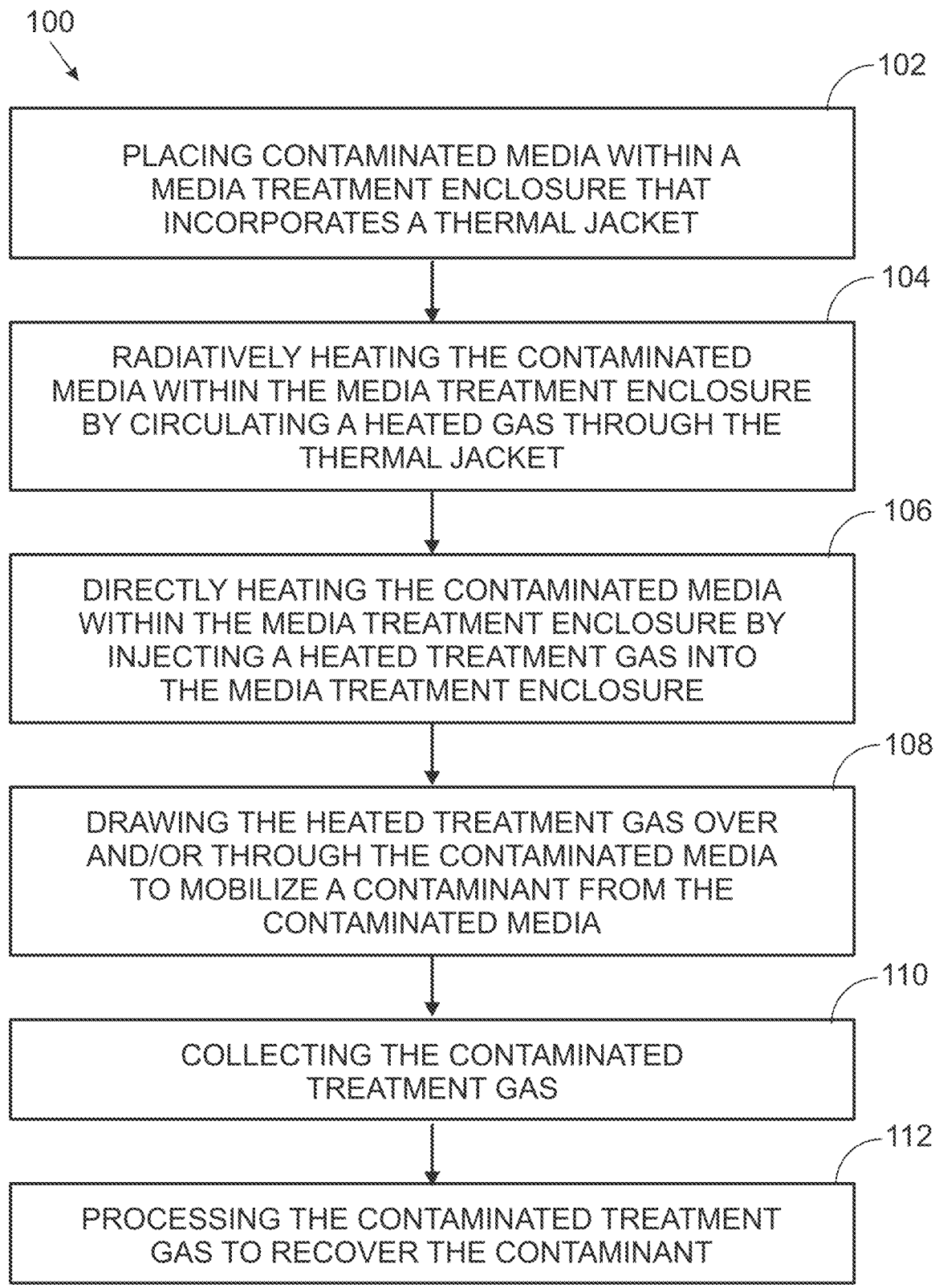
FIG. 18 is a flowchart showing an illustrative method of treating contaminated media, according to the present disclosure.

Flowchart 100 of FIG. 18 sets out an illustrative method of treating contaminated media employing the RPC apparatus of the present disclosure. The method includes placing the contaminated media within a media treatment enclosure that incorporates a thermal jacket, at step 102 of flowchart 100; radiatively heating the contaminated media within the media treatment enclosure by circulating a heated gas through the thermal jacket at step 104 of flowchart 100; directly heating the contaminated media within the media treatment enclosure by injecting a heated treatment gas into the media treatment enclosure, at step 106 of flowchart 100; drawing the heated treatment gas over and/or through the contaminated media so as to mobilize a contaminant from the contaminated media and into the treatment gas, at step 108 of flowchart 100; collecting the contaminated treatment gas, at step 110 of flowchart 100; and processing the contaminated treatment gas to recover the contaminant, at step 112 of flowchart 100.

Mapping of Contaminants

Using the locational information of the media that was treated, combined with data collected to show the type and content of contaminant recovered from the contaminated media by treatment with RPC apparatus 2, a contaminant map can be prepared.

As the amount of media that can be treated by RPC apparatus 2 is relatively large, the contaminant data from the treatment can provide greater accuracy with respect to contaminant type and location than the small samples typically collected. In particular, PFAS occurs as films on the depressed capillary fringe above the water table, and other high energy interfaces. This type of macro sampling provides the most reliable method to detect films and PFAS groundwater source structures.

The data collected from treatment operations can include, but is not limited to, the media wet density, media dry density, and contaminant intensity of the media, which in turn can accurately map PFAS and other contaminant groundwater source structures. This method can also reliably map vapor source structures and associated soil vapor plumes, so that the contaminated soils from such areas can be treated.

PFAS are released into the environment as complex chemical systems that can contain many other compounds. These PFAS formulations manipulate surface energies to create thermodynamically stable mixtures designed for a variety of tasks. These formulations are invisible to traditional investigative methods. PFAS releases are currently investigated as a classic solute transport problem. The functionality of these PFAS formulations is not currently evaluated as part of a traditional subsurface investigation. The majority of PFAS occur as reconstituted PFAS-stabilized microemulsion films situated at the top of the depressed capillary fringe. The nature of the films cause migration of PFAS and other compounds to move downward to the water table.

Mapping can be completed in real time and viewed by other parties to enable real time decisions.

CONCLUSION

As used herein, "substantially" means to be more-or-less conforming to the dimension, range, shape, concept, or other aspect modified by the term, such that a feature or component need not conform exactly. For example, a "substantially cylindrical" object means that the object resembles a cylinder, but may have one or more deviations from a true cylinder.

"Comprising," "including," and "having" (and conjugations thereof) are used interchangeably to mean including but not necessarily limited to, and are open-ended terms not intended to exclude additional, unrecited elements or method steps.

Terms such as "first", "second", and "third" are used to distinguish or identify various members of a group, or the like, and are not necessarily intended to show serial or numerical limitation.

A "porous" structure or material, as used herein, means the structure or material is substantially permeable to fluids, including gases behaving as fluids. Such porosity can be due to the presence of a plurality of pores or apertures inherent in the structure or material, or can be due to a conformation of the structure or material, i.e., fashioning it into a mesh, lattice, or other open structure.

The disclosure set forth above may encompass multiple distinct examples with independent utility. Although each of these has been disclosed in one or more illustrative form(s), the specific embodiments thereof as disclosed and illustrated herein are not to be considered in a limiting sense, because numerous variations are possible. To the extent that section headings are used within this disclosure, such headings are for organizational purposes only. The subject matter of the disclosure includes all novel and nonobvious combinations and subcombinations of the various elements, features, functions, and/or properties disclosed herein. The following claims particularly point out certain combinations and subcombinations regarded as novel and nonobvious. Other combinations and subcombinations of features, functions, elements, and/or properties may be claimed in applications claiming priority from this or a related application. Such claims, whether broader, narrower, equal, or different in scope to the original claims, also are regarded as included within the subject matter of the present disclosure.

REFERENCE NUMERALS

2. Radiative Polarity Conversion (RPC) Apparatus
4. Media Treatment Assembly
6. Base Assembly: Supports Media Treatment Assembly
8. Media Treatment Enclosure: Retains the media for treatment, provides contact between heated treatment gas and media for direct heating, provides radiative heating of the media via circulating heated polar gas
10. Media Treatment Base: Provides a base for the media treatment enclosure, permits extraction of treatment gas from media bed, and facilitates transport of the media treatment assembly
12 Forklift Pocket: Facilitates lifting and placement of RPC apparatus components
14. Base: Provides heated gas to thermal jacket; extracts treatment gas from media treatment assembly using converging flow lines and delivers the gas to a vapor treatment system
16. Heater Head Assembly: Provides sources for heated treatment gas, acts as a lid or cover for the media treatment enclosure
18. Heated Treatment Gas Source
20. Air Blower: Injects treatment gas into media treatment assembly; can be adjustable
22. Adjustable Electric Heater: Heats treatment gas before injection; can be adjustable
24. Heater Head Lifting Assembly: Lifting mechanism for the heater head assembly
26. Vertical Supports: Supports and provides height adjustment for the heater head assembly
28. Lifting Arms: Couples the heater head assembly to the heater head lifting assembly
30. Media Treatment Enclosure Sidewalls; Sidewalls defining the media treatment enclosure, and incorporating the thermal jacket
32. Thermal Jacket: Structure within the sidewalls of the media treatment enclosure to insulate and radiatively heat the media within the enclosure
34. Outermost Wall Structure: Exterior wall of the sidewall of the media treatment enclosure; helps define the intermediate air gap
36. Intermediate Wall Structure: The low thermal emissivity middle wall of the sidewall of the media treatment enclosure; helps define both the intermediate air gap and the inner jacket
38. Intermediate Air Gap: Provides insulation between the inner jacket of the thermal jacket and the exterior of the media treatment enclosure
40. Inner Wall Structure: The high thermal emissivity inner wall of the sidewall of the media treatment enclosure; helps define the inner jacket
37. Internal Thermal Jacket Wall with Emissivity Approaching 1; Absorptive: Provide a means to absorb radiative heat into the media and air gaps
42. Heated Inner Jacket: Space between the *intermedia* and inner wall structures of the sidewalls of the media treatment enclosure, configured to circulate hot polar gases around the media bed to deliver radiative heat to the media and channels inside the enclosure
44. Alignment Tab: A projection extending downward from the media treatment enclosure to facilitate alignment and coupling between the media treatment enclosure and media treatment base
46. Alignment Recess: A recess in the media treatment base that is complementary to the alignment tab of the media treatment enclosure to facilitate alignment and coupling between the media treatment enclosure and media treatment base
47. Heated Polar Gas Coupling: Couples to a source of heated polar gas
48. Heated Polar Gas Entry: Provides heated polar gas access from the base of the RPC apparatus into the thermal jacket of the media treatment enclosure
49. Polar Gas Exit: Provides an exit for the polar gas circulated in the thermal jacket of the media treatment enclosure into the base of the RPC apparatus
50. Manifold: Provides a connection for heated polar gas to the thermal jacket
51. Heated polar gas flow into heated inner jacket
52. Rectangular Port: Provides entry and exit for heated polar gases circulating through the thermal jacket
54. Polar Gas Exhaust Stack: Provides an exit for polar gases after circulating through the thermal jacket
56. Disruption Feature: Provides an obstruction to heated polar gas flow within the inner jacket
58. Porous Channel Assembly: Shapes the media for more effective treatment
60. Porous Structure: Defines the treatment gas channel
62. Treatment Gas Channel: Provides a path for heated treatment gas around shaped media
64. Vertical Media Space: Provides a space that shapes the media and enhances contact between the media and the heated treatment gas
66. Porous Plate: Helps defines a porous structure of the porous channel assembly, permits the heated treatment gas to contact the media undergoing treatment, and for the treatment gas to accept mobilized contaminants from the media
68. Channel Cover: Prevents media from infiltrating into the treatment gas channel during loading of the media treatment assembly 69. Porous Structure Base: Helps connect the porous channel assembly to the media treatment base; facilitates the exit of treatment gas from the treatment gas channels into the base for collection
70. Thermal Media: Porous substance to enhance heat transfer, heat spread, and contaminant transport within the media treatment enclosure
72. Media Retention Tab: Serves to retain the media within the media treatment enclosure until the media treatment enclosure is lifted from the media treatment base
74. Gap: Facilitates a connection between the porous channel assembly and the media treatment base, and permits treatment gas to pass through the media treatment base into the base assembly
76. Vacuum Extraction Line: Extracts treatment gas from media bed; can provide sectional treatment of media
78. Extraction Line Screen Section: Extracts treatment gas from a selected section of media within the media treatment assembly
80. Treatment Gas Extraction Line Manifold: Provides evenly applied vacuum and vapor flow throughout media bed; can provide sectional treatment of media
82. Isolation Valve: Permits selective isolated treatment for portions of the media bed
84. Treatment Gas Extraction Line: Conveys extracted treatment gas to the vapor treatment system
86. Treatment Gas Extraction Chase: Collects and isolates treatment gas extracted from media bed
87. Granular Reflective Media: Helps reflect radiant heat from the treatment gas extraction chase and into the media treatment assembly
88. Skid Guide Bumper: Facilitates an even connection with multiple skid assemblies
90. Heater Head Assembly Cover: Provides protection from weather for the heater head assembly
92. Contaminated Media: Media that contains, or is suspected to contain, one or more contaminants
94. Loading Equipment: For loading the media treatment assembly
96. Vapor Treatment System: For cooling the extracted treatment gases and collecting contaminants extracted by the treatment gases
98. Treated Media: Media after treatment within the RPC apparatus

What is claimed is:

1. A radiative polarity conversion apparatus for treating porous and colloidal media to remove contaminants, comprising:
a media treatment assembly, including a media treatment enclosure that is configured to rest upon and removably couple to a media treatment base; and
a base assembly; including a base and a heater head assembly; wherein the media treatment assembly is configured to rest upon and removably couple to the base; and the heater head assembly is configured to rest upon and form a seal with the media treatment assembly;
wherein the media treatment enclosure includes:
sidewalls that define a thermal jacket configured to be heated by circulation of a heated gas within the thermal jacket; and
a porous channel assembly including a plurality of porous structures each defining a channel for heated treatment gas, wherein adjacent pairs of porous structures define vertical spaces for receiving media to be treated;
such that when the media treatment enclosure including the porous channel assembly rests upon and is coupled to the media treatment base, the vertical spaces defined by the porous channel assembly are substantially filled with media to be treated, the media treatment assembly rests upon and couples to the base, and the heater head assembly rests upon and forms a seal with the media treatment assembly, then the radiative polarity conversion apparatus is able to:
circulate heated polar gas through the thermal jacket of the media treatment enclosure via the base;
inject heated treatment gas using the heater head assembly into the channels within the porous structures of the porous channel assembly, such that the heated treatment gas contacts the media within the vertical spaces defined by the porous channel assembly; and
withdraw the injected treatment gas from the media treatment assembly via the base.

2. The radiative polarity conversion apparatus of claim 1, further comprising a vapor emissions treatment system configured to receive the withdrawn treatment gas from the base of the radiative polarity conversion apparatus, cool the withdrawn treatment gas, and collect contaminants removed from the media by the treatment gas.

3. The radiative polarity conversion apparatus of claim 1, wherein each sidewall of the media treatment enclosure includes an outermost wall structure, an intermediate wall structure, and an inner wall structure, each sidewall being configured so that the outermost wall structure and the intermediate wall structure, in combination, define an intermediate air gap that provides thermal insulation for an interior volume of the media treatment enclosure, and the intermediate wall structure and the inner wall structure, in combination, define an inner jacket surrounding the interior volume of the media treatment enclosure on each side within which heated polar gases can be circulated to heating media undergoing treatment within the media treatment enclosure.

4. The radiative polarity conversion apparatus of claim 3, wherein each sidewall of the media treatment enclosure is configured so that a thermal emissivity of the intermediate wall structure is lower than a thermal emissivity of the inner wall structure.

5. The radiative polarity conversion apparatus of claim 3, further comprising a plurality of flow disruption features within the inner jacket, each flow disruption feature being configured to create turbulence in a heated polar gas flow within the inner jacket.

6. The radiative polarity conversion apparatus of claim 3, wherein the radiative polarity conversion apparatus is further configured to circulate an exhaust gas from a combustion engine through the inner jacket of the media treatment enclosure.

7. The radiative polarity conversion apparatus of claim 1, wherein each of the plurality of porous structures of the porous channel assembly includes a pair of substantially porous plates that define a channel for heated treatment gas therebetween, while adjacent pairs of the plurality of porous structures define the vertical spaces therebetween for receiving media to be treated.

8. The radiative polarity conversion apparatus of claim 1, wherein the channels defined by the porous structures include thermal media selected to enhance heat transfer from the heated treatment gas to the media within the vertical spaces.

9. The radiative polarity conversion apparatus of claim 8, wherein the thermal media includes a porous and isotropic thermal media.

10. The radiative polarity conversion apparatus of claim 8, wherein the thermal media includes a foamed metal or metal alloy.

11. The radiative polarity conversion apparatus of claim 8, wherein the thermal media includes a foamed metal that is foamed silver, copper, aluminum, tungsten, zinc, or an alloy thereof.

12. A method of treating contaminated media, comprising
placing the contaminated media within a media treatment enclosure that incorporates a thermal jacket;
radiatively heating the contaminated media within the media treatment enclosure by circulating a heated gas through the thermal jacket;
directly heating the contaminated media within the media treatment enclosure by injecting a heated treatment gas into the media treatment enclosure;
drawing the heated treatment gas over and/or through the contaminated media so as to mobilize a contaminant from the contaminated media and into the treatment gas;
collecting the contaminated treatment gas; and
processing the contaminated treatment gas to recover the contaminant.

13. The method of claim 12, wherein placing the contaminated media within a media treatment enclosure that incorporates a thermal jacket includes placing the contaminated media within a media treatment enclosure having sidewalls that define an outermost wall structure, an intermediate wall structure, and an inner wall structure, such that the outermost wall structure and the intermediate wall structure, in combination, define an intermediate air gap that provides thermal insulation for an interior volume of the media treatment enclosure, and the intermediate wall structure and the inner wall structure, in combination, define an inner jacket surrounding the interior of the media treatment enclosure on each side; and
radiatively heating the contaminated media within the media treatment enclosure by circulating a heated gas through the thermal jacket includes circulating the heated gas through the inner jacket of the sidewalls.

14. The method of claim 12, wherein directly heating the contaminated media within the media treatment enclosure includes injecting the heated treatment gas into the media treatment enclosure using a plurality of heated treatment gas sources incorporated in a heater head assembly coupled to the media treatment enclosure.

15. The method of claim 12, wherein directly heating the contaminated media within the media treatment enclosure includes injecting the heated treatment gas into porous channels in the contaminated media, where each porous channel is defined by a porous structure.

16. The method of claim 15, wherein injecting the heated treatment gas into porous channels in the contaminated media includes injecting the heated treatment gas into a plurality of porous structures that each include a pair of substantially porous plates that define the porous channel for heated treatment gas therebetween, while adjacent pairs of the porous structures define the vertical spaces therebetween for receiving media to be treated.

17. The method of claim 15, wherein injecting the heated treatment gas into porous channels in the contaminated media includes injecting the heated treatment gas into a plurality of porous structures that include thermal media configured to enhance heat transfer to the contaminated media.

18. The method of claim 17, wherein the thermal media includes a porous and isotropic metal or metal alloy foam that optionally includes an oxidized surface coating.

19. The method of claim 17, wherein the thermal media includes an isotropic foamed metal selected from silver, copper, aluminum, tungsten, zinc, or an alloy thereof.

20. The method of claim 12, wherein the contaminated media includes per- and polyfluoroalkyl substances, further comprising collecting locational data for the contaminated media; and using the collected locational data to map a presence of per- and polyfluoroalkyl substances in an environment.

* * * * *